(12) United States Patent
Shimoda

(10) Patent No.: US 8,576,675 B2
(45) Date of Patent: Nov. 5, 2013

(54) DATA LIBRARY APPARATUS, DATA ARCHIVE SYSTEM AND SERVER

(75) Inventor: Nozomu Shimoda, Ninomiya (JP)

(73) Assignee: Hitachi-LG Data Storage, Inc., Tokyo (JP)

( * ) Notice: Subject to any disclaimer, the term of this patent is extended or adjusted under 35 U.S.C. 154(b) by 0 days.

(21) Appl. No.: 13/539,569

(22) Filed: Jul. 2, 2012

(65) Prior Publication Data

US 2013/0077454 A1  Mar. 28, 2013

(30) Foreign Application Priority Data

Sep. 22, 2011 (JP) ................................ 2011-206722

(51) Int. Cl.
*G11B 7/00* (2006.01)

(52) U.S. Cl.
USPC ...................................................... 369/30.07

(58) Field of Classification Search
USPC .......... 369/53.22, 47.15, 53.41, 30.27, 30.07; 714/47.2, 43; 706/52, 17, 18; 709/226, 709/235
See application file for complete search history.

(56) References Cited

U.S. PATENT DOCUMENTS

| 7,676,445 | B2 * | 3/2010 | Fry et al. ........................ 706/52 |
| 7,809,990 | B2 | 10/2010 | Sasaki |
| 8,042,005 | B2 * | 10/2011 | Saito .............................. 714/43 |
| 8,185,784 | B2 * | 5/2012 | McCombs et al. ........... 714/47.2 |
| 2010/0039906 | A1 * | 2/2010 | Strachota ................... 369/30.27 |
| 2010/0039915 | A1 * | 2/2010 | Ueda et al. ................. 369/53.21 |
| 2010/0265807 | A1 * | 10/2010 | Thompson et al. ........ 369/53.41 |
| 2010/0296375 | A1 * | 11/2010 | Imoto ........................ 369/47.15 |

FOREIGN PATENT DOCUMENTS

| JP | 2004-38380 | 2/2004 |
| JP | 2006-164445 | 6/2006 |

* cited by examiner

*Primary Examiner* — Nabil Hindi
(74) *Attorney, Agent, or Firm* — Antonelli, Terry, Stout & Kraus, LLP.

(57) ABSTRACT

In a data library apparatus for managing plural pieces of record media, and performing record/reproduction of data into/from the record media, there are provided an information-memorizing memory unit and a device-controlling control unit. Having received a data record/reproduction processing request from a server, the control unit collects load information imposed on data record/reproduction devices, load information imposed on a record-media transportation device, and load information imposed on the record media. Moreover, the control unit memorizes the collected load information into the memory unit.

17 Claims, 16 Drawing Sheets

FIG. 4

| \multicolumn{3}{c}{DATA RECORD/REPRODUCTION DEVICE'S LOAD INFORMATION} |||
|---|---|---|
| DEVICE-SPECIFIC INFORMATION | SERIAL NUMBER | DRP2011OD2 |
| GENERAL | DRIVING TIME-INTERVAL | 100hr |
| | TRAY OPEN/CLOSE NUMBER-OF-TIMES | 200 |
| READ | NUMBER-OF-TIMES | 40 |
| | TIME-INTERVAL | 30hr |
| | DATA AMOUNT | 5GB |
| WRITE | NUMBER-OF-TIMES | 90 |
| | TIME-INTERVAL | 70hr |
| | DATA AMOUNT | 30GB |
| PU | LASER IRRADIATION TIME-INTERVAL | 80hr |
| | SEEK NUMBER-OF-TIMES | 800 |
| ⋮ | ⋮ | ⋮ |

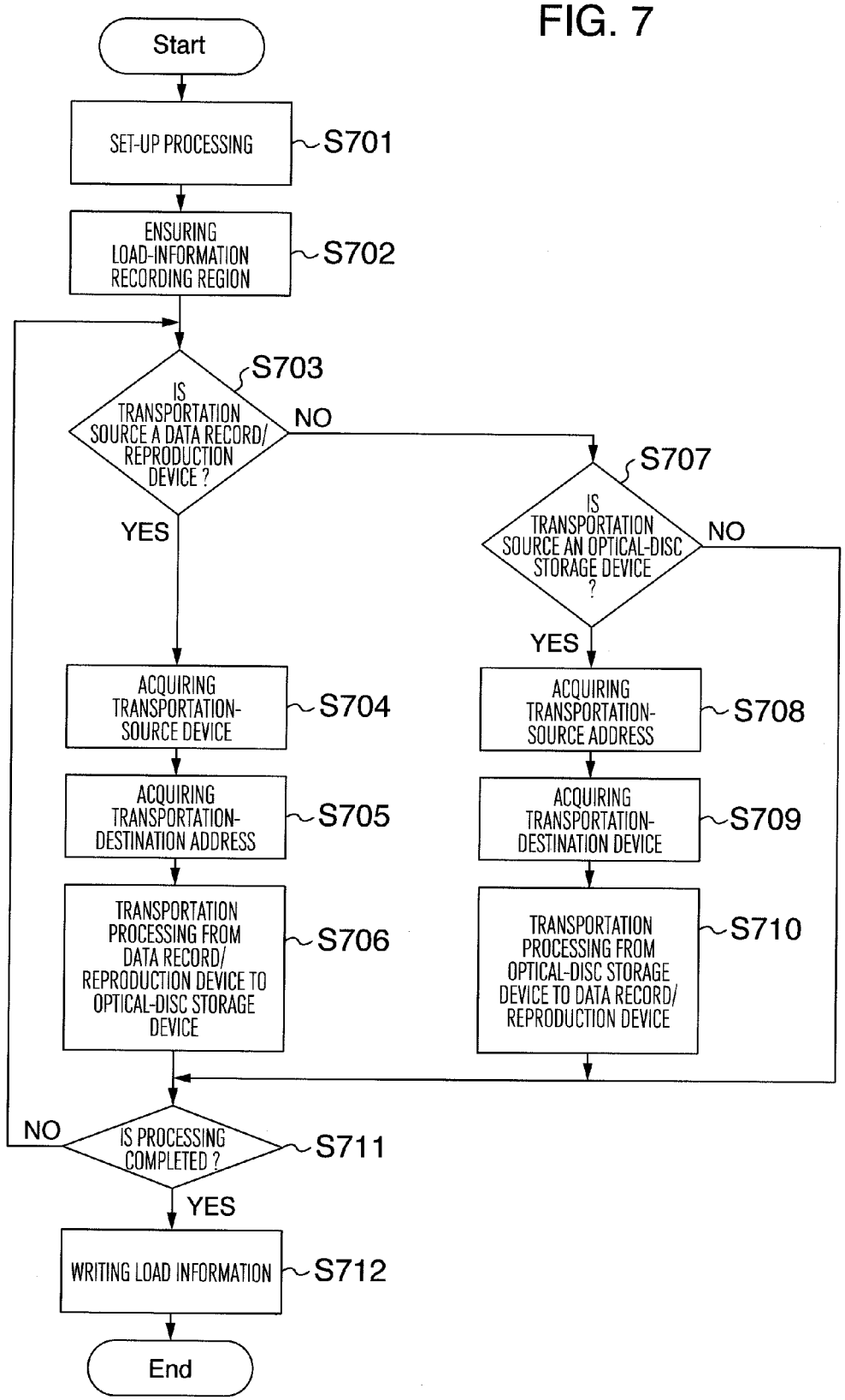

FIG. 8

| | OPTICAL-DISC TRANSPORTATION DEVICE'S LOAD INFORMATION | | | |
|---|---|---|---|---|
| | ARM UNIT 1 | ARM UNIT 2 | ARM UNIT 3 | HAND UNIT |
| FABRICATION NUMBER | ARM1001 | ARM2002 | ARM3003 | HAND9900 |
| OPERATION TIME-INTERVAL | 3hr | 2hr | 1hr | 3hr |
| OPERATION NUMBER-OF-TIMES | 100 | 75 | 50 | 100 |
| TRANSPORTATION SOURCE/DESTINATION A⇔a | | 10 | | |
| TRANSPORTATION SOURCE/DESTINATION --- | --- | --- | --- | --- |
| TRANSPORTATION SOURCE/DESTINATION B⇔a | | 20 | | |
| TRANSPORTATION SOURCE/DESTINATION --- | --- | --- | --- | --- |
| STRAIGHT-TRAVELING DISTANCE | 75 | 50 | 25 | --- |
| ROTATIONAL DISTANCE LEFT | 25 | 0 | 25 | 100 |
| ROTATIONAL DISTANCE RIGHT | 0 | 50 | 0 | 100 |
| DISC-HOLDING UNIT'S OPEN/CLOSE NUMBER-OF-TIMES | --- | --- | --- | 200 |
| --- | --- | --- | --- | --- |

FIG. 10

OPTICAL-DISC MANAGEMENT INFORMATION

| MANAGEMENT NUMBER | SERIAL NUMBER | DISC TYPE | MANAGEMENT START DATE | FINAL UPDATE DATE | ACCESS NUMBER-OF-TIMES | DETERIORATION DEGREE |
|---|---|---|---|---|---|---|
| 1 | 00001961h | BD-R | 2011/1/1 | 2011/5/5 | 100 | 1 |
| 2 | 00001961h | BD-R | 2011/1/1 | – | 1 | 0 |
| 3 | 00001964h | BD-R | 2011/1/1 | – | 1 | 0 |
| 4 | 00001964h | BD-R | 2010/9/9 | 2011/3/3 | 100 | 2 |
| 5 | 00001970h | BD-RE | 2010/8/8 | – | 1 | 0 |
| 6 | 00001981h | BD-R | 2009/7/7 | 2009/10/10 | 150 | 3 |
| 7 | 00001986h | BD-R | 2011/2/2 | 2011/5/5 | 2 | 0 |
| 8 | 00001987h | BD-RE | 2008/6/6 | 2008/8/8 | 200 | 4 |
| 9 | 00001987h | BD-RE | 2008/6/6 | – | 1 | 1 |
| ---- | ---- | ---- | ---- | ---- | ---- | ---- |

FIG. 13

| DATA-LIBRARY-APPARATUS MANAGEMENT INFORMATION | | | | | | |
|---|---|---|---|---|---|---|
| DEVICE NAME | SERIAL NUMBER | DATA RECORD/REPRODUCTION DEVICE | | OPTICAL-DISC TRANSPORTATION DEVICE | OPTICAL DISC | |
| | | SERIAL NUMBER | LOAD INFORMATION | LOAD INFORMATION | MANAGEMENT INFORMATION | |
| DATA LIBRARY APPARATUS 1 | DL2011SO1 | DRP201OD1 | INF-RP101 | INF-DR001 | INF-DI001 | |
| | | DRP201OD2 | INF-RP102 | | | |
| | | --- | --- | | | |
| DATA LIBRARY APPARATUS 2 | DL2011SO2 | DRP201OD7 | INF-RP201 | INF-DR002 | INF-DI002 | |
| | | DRP200OD2 | INF-RP202 | | | |
| | | ---- | ---- | ---- | ---- | |
| ---- | ---- | | | | | |

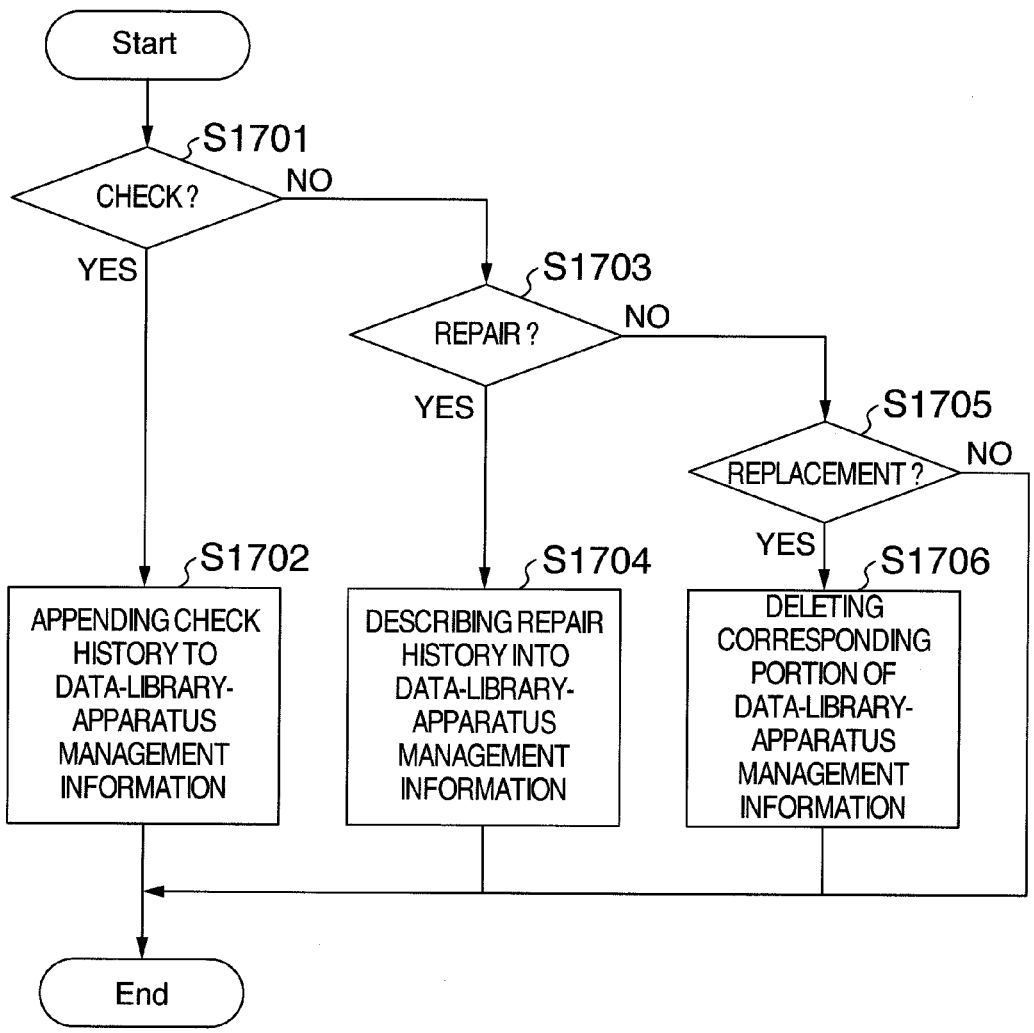

DATA LIBRARY APPARATUS, DATA ARCHIVE SYSTEM AND SERVER

INCORPORATION BY REFERENCE

The present application claims priority from Japanese application JP2011-206722 filed on Sep. 22, 2011, the content of which is hereby incorporated by reference into this application.

BACKGROUND OF THE INVENTION

The present invention relates to a data library apparatus, data archive system, and server.

JP-A-2004-38380 exists as a background art in the present technological field. In JP-A-2004-38380, the description has been given as follows: "Usually, a workstation or personal computer is used as an information processing device employed as a server 105. Control software 107, which is installed into the server 105, controls an optical-disc library apparatus 101 in such operations as transportation of optical-disc media M and accesses to the optical-disc media M. If an abnormality is detected from the optical-disc library apparatus 101, the server 105 receives a report to the effect."

Also, in JP-A-2006-164445 (corresponding to U.S. Pat. No. 7,809,990), the description has been given as follows: "Magnetic-tape drive devices 37*l* to 37*n* perform data read/write of information from/into magnetic-tape cartridges 35*l* to 35*m*. Moreover, a memory-information read processing unit 41 of a magnetic-tape library apparatus 30 reads this information from memories of the magnetic-tape-built-in magnetic-tape cartridges 35*l* to 35*m*. Furthermore, based on the information read, a maintenance/replacement judgment unit 48 makes a judgment on the maintenance or replacement of the magnetic-tape drive devices 37*l* to 37*n*."

SUMMARY OF THE INVENTION

In JP-A-2004-38380, drive statistics information 109 exists in the optical-disc library apparatus 101 for each of respective optical-disc drive devices 103 and the optical-disc media M.

In JP-A-2004-38380, however, the information on the abnormality detection of each optical-disc drive device 103, and the information on the abnormality detection of each optical-disc medium M are transmitted to the server 105 in a separate and independent manner. As a result, there exists a problem that the communications frequency becomes higher, and that the processing load imposed on the server 105 and the library apparatus 101 becomes larger.

Also, in JP-A-2006-164445, the library apparatus 30 is equipped with a record unit for recording error frequencies. No consideration, however, is given to the transmission of these pieces of information onto the server side.

Accordingly, an object of the present invention is to provide a data library apparatus, data archive system, and server which allows implementation of a reduction in the processing load imposed on the data library apparatus and server.

In order to solve the above-described problem, for example, configurations are employed which are disclosed within the scope of the appended claims.

According to the present invention, it becomes possible to provide the data library apparatus and data archive system which makes it possible to record information that is useful for recognizing the load imposed on the apparatus.

The other problems, configurations, and effects of the present invention will become apparent from the following description of embodiments.

Other objects, features and advantages of the invention will become apparent from the following description of the embodiments of the invention taken in conjunction with the accompanying drawings.

BRIEF DESCRIPTION OF THE DRAWINGS

FIG. 4 is a table for illustrating load information on each data record/reproduction device;

FIG. 7 is a flowchart for illustrating the operation of the optical-disc transportation device;

FIG. 8 is a table for illustrating load information on the optical-disc transportation device;

FIG. 10 is a table for illustrating the optical-disc management information;

FIG. 13 is a table for illustrating data-library-apparatus management information managed by the data archive system;

FIG. 17 is a flowchart for illustrating an information-processing-mode determination operation of the data-library-apparatus management information.

DETAILED DESCRIPTION OF THE EMBODIMENT

Figure 1:
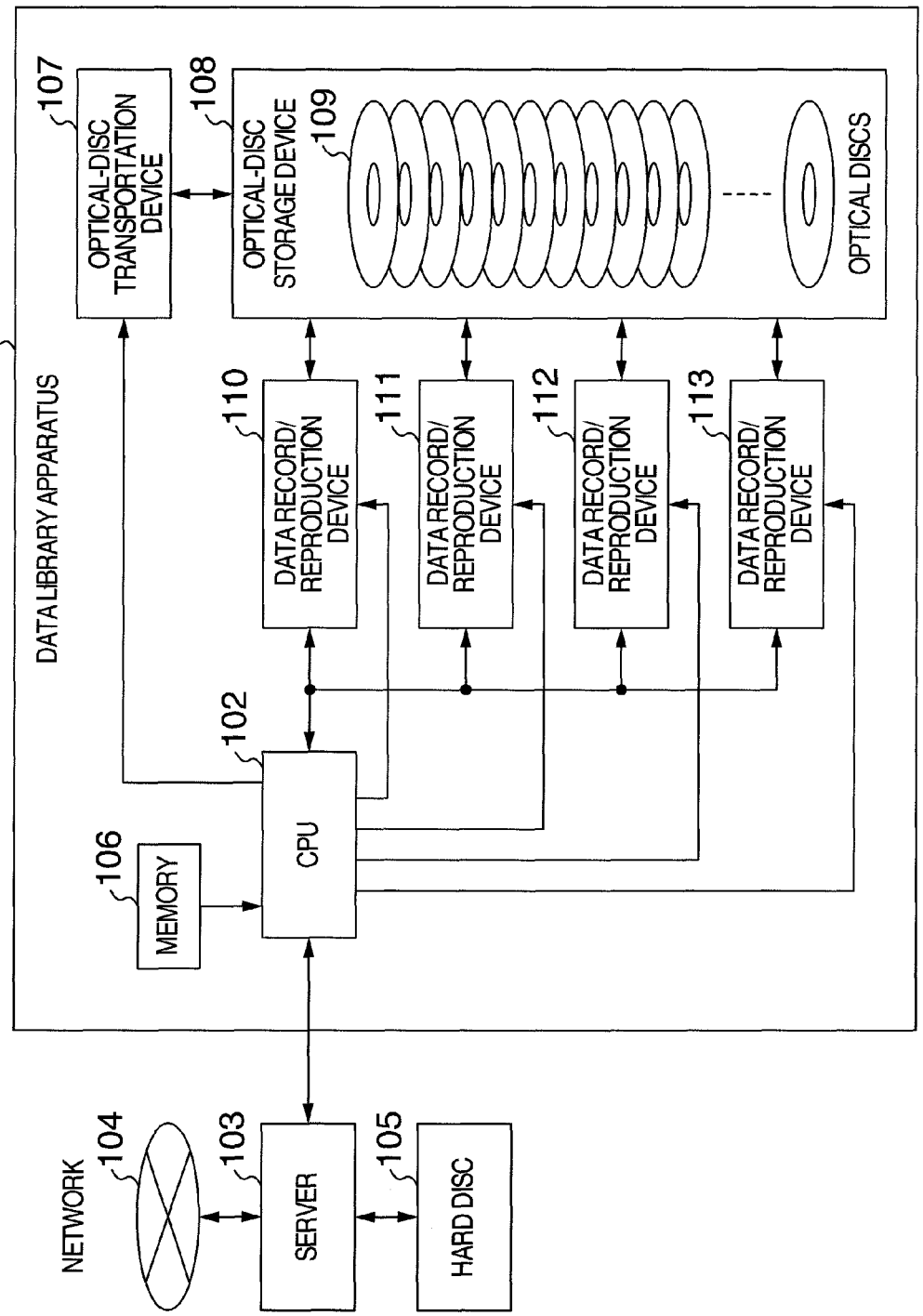
FIG. 1 is a block diagram for illustrating the configuration of a data library apparatus.

Hereinafter, referring to the drawings, the explanation will be given below concerning the embodiments.

Embodiment 1

FIG. 1 is a block diagram for illustrating the configuration of a data library apparatus. A reference numeral 101 denotes the data library apparatus. At the time of data record, the data library apparatus 101 receives data from a network 104. Moreover, the data library apparatus 101 accumulates the data into a hard disc 105 via a server 103, then recording the accumulated data into plural pieces of optical discs 109. At the time of data reproduction, the data library apparatus 101 reproduces the data from the hard disc 105 or the optical discs 109, then transmitting the reproduced data to the network 104 via the server 103. The reference numeral 103 denotes the server. The server 103 controls the data library apparatus 101 and the hard disc 105 on the basis of communications that the server 103 performs with a CPU (: Central Processing Unit) 102 which is built in the data library apparatus 101. In this way, the server 103 performs data managements such as data record/reproduction and data transmission/reception via the network 104.

The reference numeral 105 denotes the hard disc. In accordance with the control performed by the server 103, the hard disc 105 accumulates therein the data transmitted from the network 104. The reference numeral 109 denotes the plural pieces of optical discs which are stored into an optical-disc storage device 108. Although only the single optical-disc storage device 108 is illustrated in FIG. 1, it is also allowable to provide a plurality of optical-disc storage devices 108 inside the apparatus 101. For example, it is also allowable to separately use the plurality of optical-disc storage devices 108 depending on the usage, such that one group is constituted from unrecorded-optical-disc storage devices, and the other group is constituted from prerecorded-optical-disc storage devices. Of course, it is also allowable to partition the inside of the optical-disc storage device 108 into an unrecorded-optical-disc storage region and a prerecorded-optical-disc storage region.

At the time of data record, the optical discs 109 are taken out of the optical-disc storage device 108 by an optical-disc transportation device 107, then being placed on data record/reproduction devices 110, 111, 112, and 113. When the data record is terminated, the optical discs 109 are returned back to the optical-disc storage device 108 by the optical-disc transportation device 107. At the time of data reproduction, the optical discs 109 are taken out of the optical-disc storage device 108 by the optical-disc transportation device 107, then being placed on the data record/reproduction devices 110, 111, 112, and 113. When the data reproduction is terminated, the optical discs 109 are returned back to the optical-disc storage device 108 by the optical-disc transportation device 107.

The reference numerals 110, 111, 112, and 113 denote the data record/reproduction devices. In accordance with the control performed by the CPU 102 of the data library apparatus 101, the data record/reproduction devices 110, 111, 112, and 113 perform the data record/reproduction into/from the optical discs 109. The reference numeral 107 denotes the optical-disc transportation device. In accordance with the control performed by the CPU 102 of the data library apparatus 101, the optical-disc transportation device 107 takes the optical discs 109 out of the optical-disc storage device 108 to transport the optical discs 109, then placing the optical discs 109 on the data record/reproduction devices 110, 111, 112, and 113. Otherwise, the optical-disc transportation device 107 receives the optical discs 109 from the data record/reproduction devices 110, 111, 112, and 113 to transport the optical discs 109, then storing the optical discs 109 into the optical-disc storage device 108.

The reference numeral 102 denotes the CPU of the data library apparatus 101. Based on a request from the server 103, the CPU 102 controls the optical-disc transportation device 107. By performing this control, the CPU 102 selects a desired optical disc 109 out of the plural pieces of optical discs 109 stored into the optical-disc storage device 108, then sending the desired optical disc 109 to the data record/reproduction devices 110, 111, 112, and 113. Also, the CPU 102 controls the optical-disc transportation device 107, thereby receiving an optical disc 109 from the data record/reproduction devices 110, 111, 112, and 113, and then storing the optical disc 109 into a predetermined position inside the optical-disc storage device 108. A reference numeral 106 denotes a memory. The memory 106 records therein a program for controlling the CPU 102 of the data library apparatus 101, and respective types of setting information. Also, the memory 106 performs the record/reproduction of data record/reproduction devices' load information which is transmitted from the data record/reproduction devices 110, 111, 112, and 113 via the CPU 102 of the data library apparatus 101. Also, the memory 106 performs the record/reproduction of optical-disc transportation device's load information which is transmitted from the optical-disc transportation device 107 via the CPU 102 of the data library apparatus 101.

Figure 2:
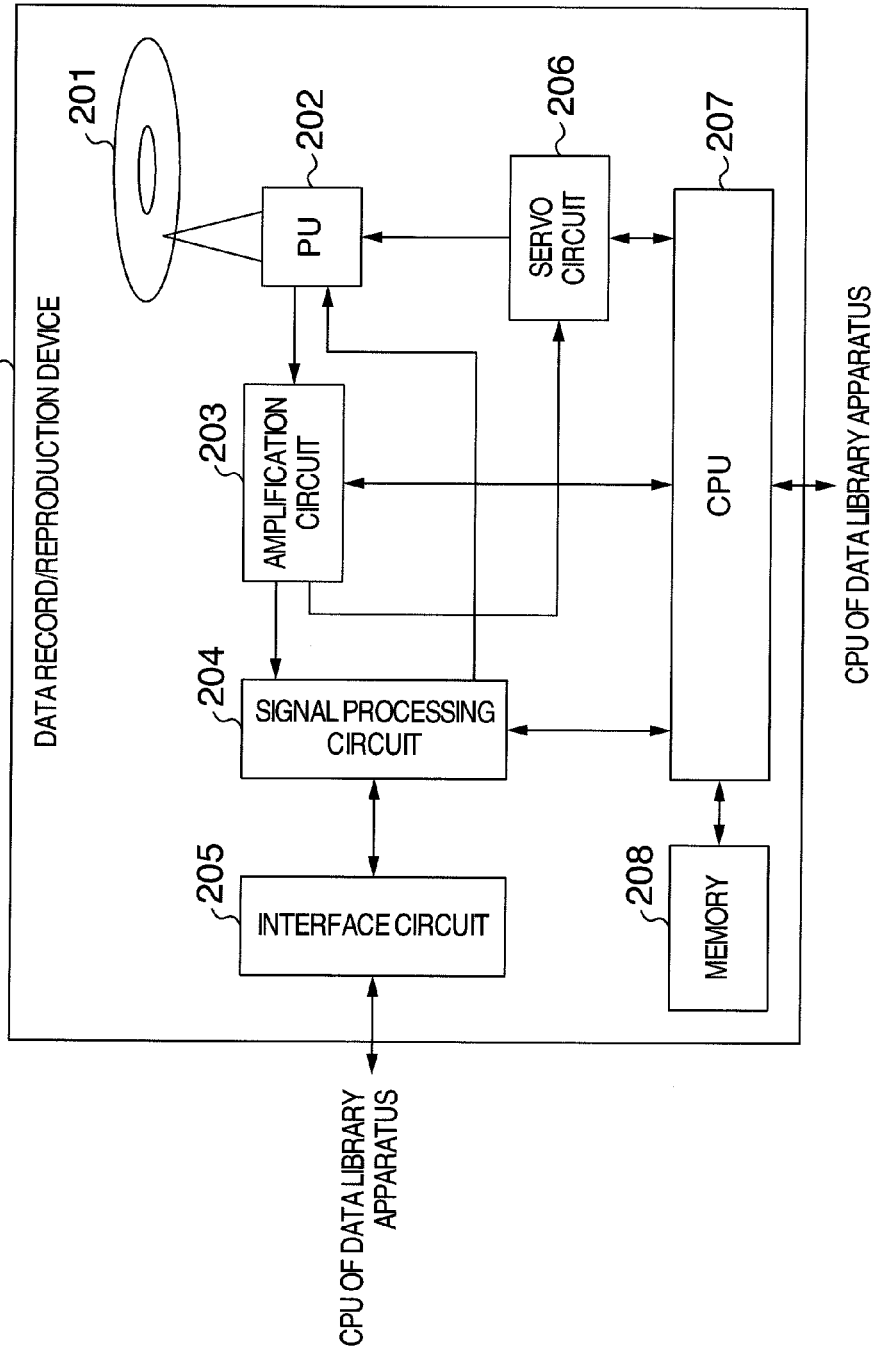
FIG. 2 is a block diagram for illustrating the configuration of each data record/reproduction device.

FIG. 2 is a block diagram for illustrating the configuration of each data record/reproduction device. The reference numeral 110 denotes the data record/reproduction device. The data record/reproduction device 110 records, into an optical disc, the data inputted from the CPU 102 of the data library apparatus 101. Also, the data record/reproduction device 110 outputs the data reproduced from the optical disc to the CPU 102 of the data library apparatus 101.

A reference numeral 207 denotes a CPU. The CPU 207 performs control over the record/reproduction processing by the data record/reproduction device 110. Incidentally, instead of the CPU, an arbitrary circuit is usable which is capable of performing basically the same control. Also, when starting the record/reproduction processing by the data record/reproduction device 110, the CPU 207 starts collection of the load information on each block that the CPU 207 itself manages. Moreover, when terminating the record/reproduction processing, the CPU 207 records the collected load information into a memory, then outputting the recorded load information to the CPU 102 of the data library apparatus 101. A reference numeral 201 denotes such a data-recoding medium as, e.g., BD-R (: Blu-ray Disc Recordable). Incidentally, in the following explanation, the data-recoding medium will be explained merely as an optical disc 201. Also, the data-recoding medium is not necessarily limited to the optical disc, but may also be such a data-recoding medium as magneto-optical disc or hologram.

A reference numeral 202 denotes an optical pickup. The optical pickup 202 reads a signal from the optical disc 201, then sending the read signal to an amplification circuit 203. Also, the optical pickup 202 records, into the optical disc 201, a modulation signal sent from a signal processing circuit 204. The reference numeral 203 denotes the amplification circuit. The amplification circuit 203 amplifies the reproduced signal read from the optical disc 201 via the optical pickup 202, then sending the amplified signal to the signal processing circuit 204. Also, the amplification circuit 203 generates a servo signal, then sending the generated servo signal to a servo circuit 206. The reference numeral 204 denotes the signal processing circuit. The signal processing circuit 204 demodulates the inputted signal, then applying such a processing as an error-correcting processing to the demodulated signal, and sending the error-correction-subjected signal to an interface circuit 205. Also, the signal processing circuit 204 performs such a processing as adding an error-correcting sign to data sent from the interface circuit 205, then modulating the error-correcting-sign-added data, and sending the modulated data to the optical pickup 202. The reference numeral 205 denotes the interface circuit. The interface circuit 205 performs a data transfer processing in compliance with such a transfer scheme standard as, e.g., SATA (: Serial Advanced Technology Attachment). At the time of the data transfer, the interface circuit 205 sends the data sent from the signal processing circuit 204 to the CPU 102 of the data library apparatus 101, i.e., the host. Also, the interface circuit 205 sends, to the signal processing circuit 204, the data sent from the CPU 102 of the data library apparatus 101, i.e., the host. A reference numeral 208 denotes the memory. The memory 208 stores therein such information as a program for controlling the data record/reproduction device 110, respective types of setting information, and medium information acquired from the optical disc 201.

Also, the memory 208 is used as a region for temporarily storing the load information on the respective blocks that the CPU 207 itself manages. Incidentally, the example has been indicated where the memory 208 is connected to the CPU 207 inside the data record/reproduction device 110. The memory 208, however, may also be connected to whatever portion positioned outside/inside the data record/reproduction device 110. Also, the memory is not necessarily required, but whatever storage (e.g., a hard disc) is usable as long as it stores the information. The reference numeral 206 denotes the servo circuit. The servo circuit 206 controls the optical pickup 202 on the basis of the servo signal generated by the amplification circuit 203.

The data record/reproduction device 110 of the above-described configuration allows data to be recorded into the optical disc 201 in accordance with the instruction from the CPU 102 of the data library apparatus 101. Also, this data record/reproduction device 110 allows the data to be reproduced from the optical disc 201, thereby making it possible to pass the reproduced data to the CPU 102 of the data library apparatus 101. Incidentally, here, the explanation has been given regarding the data record/reproduction device 110. The configuration of the data record/reproduction devices 111, 112, and 113, however, is the same as that of the data record/reproduction device 110.

Figure 3:
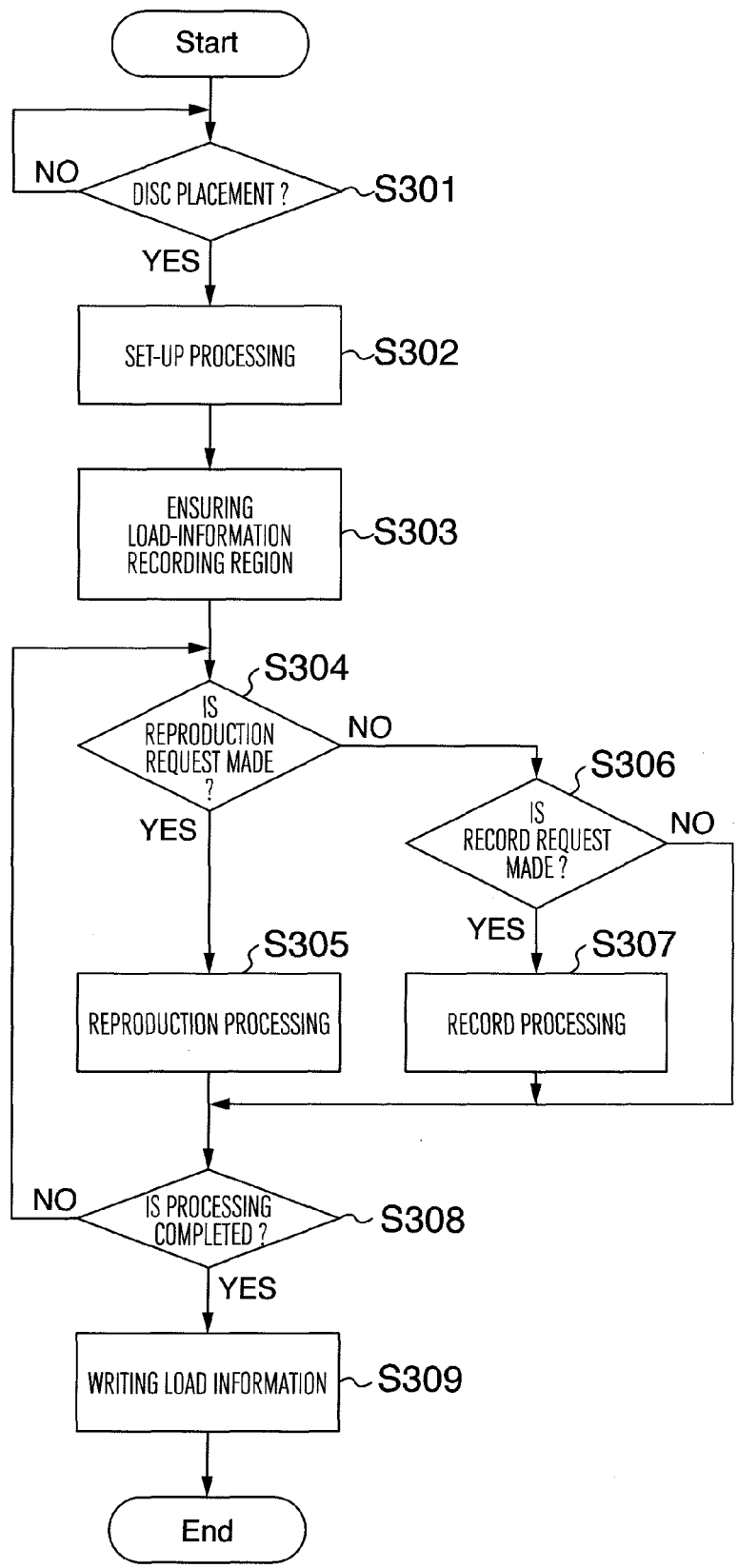
FIG. 3 is a flowchart for illustrating the operation of each data record/reproduction device.

FIG. 3 is a flowchart for illustrating the operation of each data record/reproduction device.

If, at a step S301, the optical disc is placed on the data record/reproduction device, a set-up processing for starting the operation of the data record/reproduction device is performed at a step S302.

Next, at a step S303, a region for recording the data record/reproduction device's load information is ensured. The recording region is ensured on, e.g., the memory 208 of the data record/reproduction device. Here, the desirable memory region to be ensured is an unused region where the other information existing on the memory is not overwritten by the load information, and is of a size necessary and sufficient for recording the load information.

Next, if, at a step S304, the data reproduction is requested from the CPU of the data library apparatus, the data reproduction processing is performed at a step S305. Otherwise, if, at a step S306, the data record is requested from the CPU of the data library apparatus, the data record processing is performed at a step S307.

Incidentally, although not explicitly described as a step, the data record/reproduction device's load information is collected during the reproduction processing at the step S305 and the record processing at the step S307.

Next, if, at a step S308, the reproduction/record processing is completed, at a step S309, the data record/reproduction device's load information collected is written into the region which is ensured at the step S303. In this way, the processing is terminated.

FIG. 4 is a table for illustrating an example of the data record/reproduction device's load information.

The data record/reproduction device's load information is information for indicating the load which is imposed on the data record/reproduction device. The information which are conceivable as its example are as follows: Information about the device in general, such as driving time-interval and number-of-times in which a tray for placing the optical disc is opened/closed, information about optical-disc access, such as read/write number-of-times and time-interval from/into the optical disc, and information about the optical pickup, such as laser irradiation time-interval and seek number-of-times for the optical disc. Of course, the load information is not limited to this example. Namely, as long as the information is the one about the data record/reproduction device's load, it is preferable to record the information as much as possible and as detailed as possible. Additionally, the load information may be acquired every time the data record/reproduction device operates, or may be acquired one time every several times in which it operates.

Incidentally, the load information illustrated in FIG. 4, which is recorded based on the operation flowchart illustrated in FIG. 3, is the load information on the one of the data record/reproduction devices 110, 111, 112, and 113. Namely, the load information is individually recorded by each of the data record/reproduction devices 110, 111, 112, and 113. In view of this situation, in order to identify on which of the data record/reproduction devices the load information is, the device-specific information such as serial number is also recorded simultaneously.

The load information recorded by each data record/reproduction device may be managed by each data record/reproduction device itself. It is desirable, however, that the recorded load information be managed by the CPU 102 of the data library apparatus 101, i.e., the host role for each data record/reproduction device. Accordingly, the load information recorded by each data record/reproduction device is transmitted to the CPU 102 of the data library apparatus 101, then being recorded into the memory 106 of the data library apparatus 101.

Additionally, as is illustrated in FIG. 3, the load information about the single reproduction/record processing is recorded into the memory 208 of each data record/reproduction device. In addition thereto, the following record processing is also allowable: Namely, while a single reproduction/record processing is underway, the serial load information is transmitted to the CPU 102 of the data library apparatus 101. Moreover, the CPU 102 of the data library apparatus 101 collects the serial load information, then recording the collected load information into the memory 106.

Also, the following record processings are also allowable: Namely, when the capacity of the memory 208 of the data record/reproduction device becomes equal to a certain constant amount, the load information is transmitted to the CPU 102, then being recorded into the memory 106. Also, the transmission timing is changed, depending on the operation situation of the data record/reproduction device or the data library apparatus. For example, when the data record/reproduction device or the data library apparatus is not in a busy operation, such that the device or the apparatus falls into a sleep state, the load information is transmitted from the memory 208 of the data record/reproduction device to the CPU 102, then being recorded into the memory 106. Additionally, it is also conceivable that the data library apparatus makes reference to the load information when it issues an instruction to the data record/reproduction device. In this case, the data library apparatus is so set as to receive the load information from the data record/reproduction device every time it issues the instruction thereto. This setting allows the data library apparatus to issue the instruction based on the accurate load information, which is rational and convenient. Of course, the data library apparatus may also be so set as to receive the load information one time every several times in a collective manner, taking into consideration a communications load needed for the information transmission/reception.

Also, the following managements are also allowable: Namely, the recorded load information is transmitted to the server 103, i.e., the host role for each data record/reproduction device, then being managed in the server 103. At this time, the manager of the information individually manages the load information on each data record/reproduction device. Otherwise, the manager manages the load information as a single piece of information by merging these respective plural pieces of load information.

Also, in order to make a true measurement on the load on each data record/reproduction device, the data record/reproduction device's load information to be recorded is required to be cumulative load information. Here, this cumulative load information is obtained by cumulating the load information for each operation of each data record/reproduction device. Accordingly, the manager of the information manages the load information after cumulating the load information on each operation basis.

Incidentally, when the information is transmitted to a host role, it is preferable to record transmission information as well, such as time-and-date on which the information is transmitted. Also, even in the case of the information already transmitted to the host role, this information continues to be managed as the backup. This management as the backup results in a merit that, if the host role should lose the information, the lost information can be restored by resending the backup. Also, the data record/reproduction devices 110, 111, 112, and 113 are assumed to operate in parallel to each other. Accordingly, the memory for recording the information necessitates a size which is sufficient for recording the information by the amount of the number of the data record/reproduction devices. If the memory in a sufficient size should not be able to be ensured, it is preferable to perform the control so that at least the already-existing information is not overwritten, or so that the load information does not fail to be recorded. This control is implemented by such countermeasures as waiting for the processing to start until the memory can be ensured, and issuing an error notice.

Figure 5:
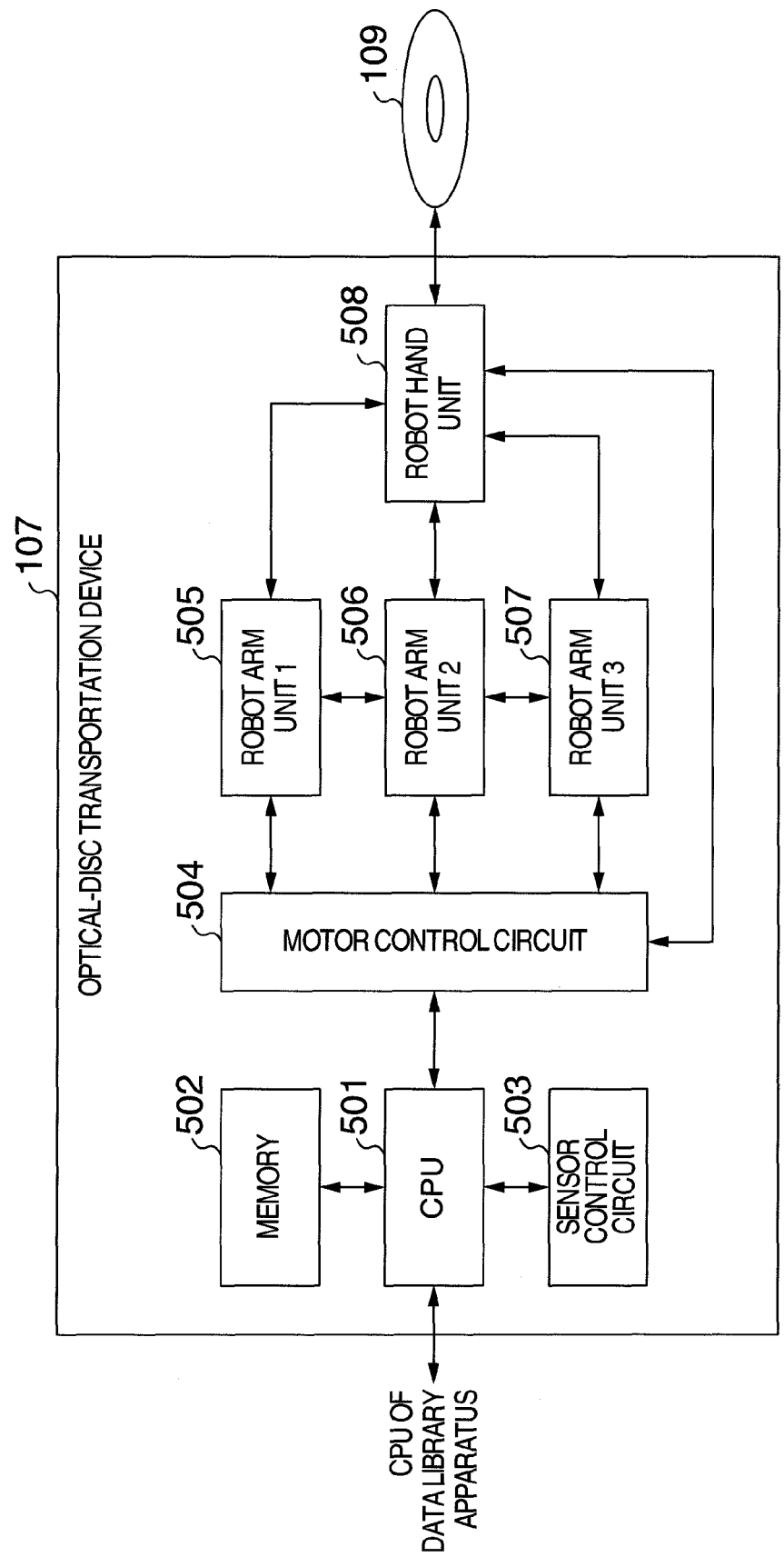
FIG. 5 is a block diagram for illustrating an optical-disc transportation device.
Figure 6:
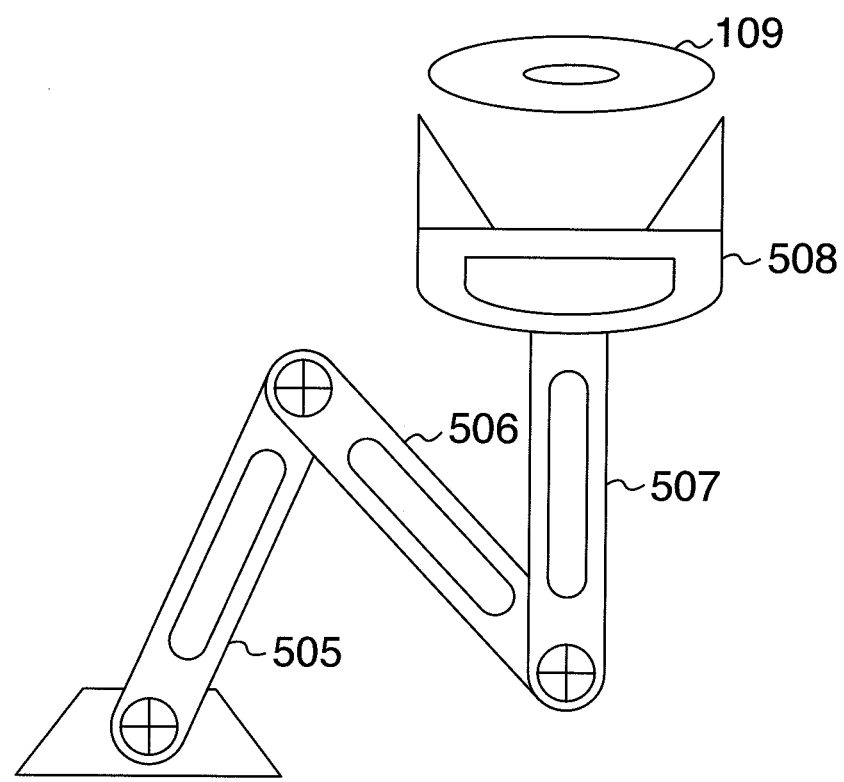
FIG. 6 is an outer-appearance diagram of the optical-disc transportation device.

FIG. 5 is a block diagram of the optical-disc transportation device, and FIG. 6 is an outer-appearance diagram of the optical-disc transportation device. The reference numeral 107 denotes the optical-disc transportation device. Having received an instruction from the CPU 102 of the data library apparatus 101, the optical-disc transportation device 107 takes the optical discs 109 out of the optical-disc storage device 108, then placing the optical discs 109 on the data record/reproduction devices 110, 111, 112, and 113. Also, the optical-disc transportation device 107 takes the optical discs 109 out of the data record/reproduction devices 110, 111, 112, and 113, then storing the optical discs 109 into the optical-disc storage device 108.

A reference numeral 501 denotes a CPU. The CPU 501 performs control over the optical-disc transportation device 107. Also, when starting the operation, the CPU 501 starts collection of the load information on each block that the CPU 501 itself manages. Moreover, when terminating the operation, the CPU 501 records the collected information into a memory, then outputting the recorded information to the CPU 102 of the data library apparatus 101.

A reference numeral 502 denotes the memory. The memory 502 stores therein such information as a program for controlling the optical-disc transportation device 107, and the respective types of setting information. Also, the memory 502 is used as a region for temporarily storing the load information on the respective blocks that the CPU 501 itself manages.

Incidentally, an example has been indicated where the memory 502 is connected to the CPU 501 inside the optical-disc transportation device 107. The memory 502, however, may also be connected to whatever portion positioned outside/inside the optical-disc transportation device 107. Also, the memory is not necessarily required, but whatever storage (e.g., a hard disc) is usable as long as it stores the information. A reference numeral 503 denotes a sensor control circuit. Based on an instruction from the CPU 501, the sensor control circuit 503 controls each type of sensor. Also, the sensor control circuit 503 receives an input signal from each type of sensor, then notifying the CPU 501 of the input signal.

A reference numeral 504 denotes a motor control circuit. Based on an instruction from the CPU 501, the motor control circuit 504 drives robot arm units 505, 506, and 507. Also, the motor control circuit 504 drives a robot hand unit 508.

The robot arm units 505, 506, and 507 adjust the position of the robot hand unit 508 by making straight-traveling movements such as forward travelling and backward travelling, and rotational movements.

The profile of the robot hand unit 508 is so designed as to allow the optical discs 109 to be held without being damaged. The robot hand unit 508 performs the take-in/take-out and reception/pass of the optical discs 109 with respect to the optical-disc storage device 108 and the data record/reproduction devices 110, 111, 112, and 113. Also, the load imposed on each of the robot arm units 505, 506, and 507 differs, depending on the transportation route associated therewith. For example, the load imposed on each robot arm unit differs between the following two cases: A case where the optical disc is transported from the front-end address of the optical-disc storage device 108 to the data record/reproduction device 110, and a case where the optical disc is transported from the terminal-end address of the optical-disc storage device 108 to the data record/reproduction device 113.

The optical-disc transportation device of the above-described configuration allows the optical discs to be transported between the optical-disc storage device and each data record/reproduction device in accordance with the instruction from the CPU 102 of the data library apparatus.

Incidentally, here, the example has been indicted where only the single optical-disc transportation device 107 exists inside the data library apparatus 101. It is also allowable, however, to provide a plurality of optical-disc transportation devices 107 therein. Also, the profile of the optical-disc transportation device 107 is not limited to the example illustrated in FIG. 6. For example, it is also allowable to transport the optical disc in such a manner that the optical disc is fixed by taking advantage of the central hole of the optical disc.

FIG. 7 is a flowchart for illustrating the operation of the optical-disc transportation device 107.

At a step S701, a set-up processing for starting the operation of the optical-disc transportation device 107 is performed.

Next, at a step S702, a region for recording the optical-disc transportation device's load information is ensured. The recording region is ensured on, e.g., the memory 502 of the optical-disc transportation device 107.

Next, if, at a step S703, the host has specified that the transportation source of the optical disc is a data record/reproduction device, information for indicating which of the data record/reproduction devices 110, 111, 112, and 113 has been specified is acquired at a step S704.

Next, information for indicating into which address inside the optical-disc storage device 108 the optical disc is to be transported and stored is acquired at a step S705. Moreover, at a step S706, the optical-disc transportation device 107 receives the optical disc from the data record/reproduction device, i.e., the specified transportation source. Furthermore, the device 107 transports and stores the received optical disc into the predetermined address inside the optical-disc storage device 108, i.e., the specified transportation destination.

Otherwise, if, at a step S707, the host has specified that the transportation source of the optical disc is the optical-disc storage device 108, information for indicating from which address inside the optical-disc storage device 108 the optical disc is to be transported is acquired at a step S708.

Next, information for indicating to which of the data record/reproduction devices 110, 111, 112, and 113 the optical disc is to be transported and passed over is acquired at a step S709. Moreover, at a step S710, the optical-disc transportation device 107 acquires the optical disc from the predetermined address inside the optical-disc storage device 108, i.e., the specified transportation source. Furthermore, the device 107 transports and places the acquired optical disc into the data record/reproduction device, i.e., the specified transportation destination.

Incidentally, although not described explicitly as a step, the optical-disc transportation device's load information is collected during the transportation processing at the step S706 or the step S710.

Next, if, at a step S711, the transportation processing is completed, at a step S712, the optical-disc transportation device's load information collected is written into the region which is ensured at the step S702. In this way, the processing is terminated.

FIG. 8 is a table for illustrating an example of the optical-disc transportation device's load information.

The optical-disc transportation device's load information is information for indicating the load which is imposed on the optical-disc transportation device 107. The load information will be recorded for the respective blocks constituting the optical-disc transportation device 107, i.e., the robot arm unit 1, the robot arm unit 2, the robot arm unit 3, and the robot hand unit. Of course, it is also allowable to record the load information for the entire optical-disc transportation device 107. It is preferable, however, to record the information as much as possible and as detailed as possible. Accordingly, here, the example is indicated where the load information on each block basis will be recorded. Additionally, the load information may be acquired every time the optical-disc transportation device 107 operates, or may be acquired one time every several times in which it operates.

Also, it is allowable to record the load information on each block basis independently of each other. The information which will be recorded on each block basis as its example are as follows: Operation time-interval and number-of-times of each block, from where to where the optical disc is transported, each arm unit's straight-traveling distance, rotational direction, and rotational distance, number-of-times in which a disc-holding unit of the hand unit is opened/closed, and the like. Of course, the load information is not limited to this example. Namely, as long as the information is the one about the optical-disc transportation device's load information, it is preferable to record the information.

Also, in order to establish a one-to-one correspondence relationship between the recorded load information and each actual block, each-block-specific information such as fabrication number is also recorded simultaneously.

The load information recorded by the optical-disc transportation device 107 is passed over to the server 103 via the CPU 102 of the data library apparatus, then being managed in the server 103.

Also, it is preferable to record transmission information as well, such as time-and-date on which the load information is transmitted to the server 103. Of course, the load information may also be managed by the optical-disc transportation device 107 itself.

Also, the information passed over to the server 103 is managed as the backup. This management as the backup results in a merit that, if the server 103 should lose the information, the lost information can be restored by resending the managed information to the server 103.

Incidentally, if the management of the load information is not made in the server 103, the load information to be recorded is not the load information for each operation of the optical-disc transportation device 107, but integrated load information. Here, this integrated load information is obtained by integrating the load information for each operation of the device 107.

Also, the CPU 102 of the data library apparatus creates a single piece of information by merging the data record/reproduction device's load information transmitted from each data record/reproduction device with the optical-disc transportation device's load information transmitted from the optical-disc transportation device 107. Moreover, the CPU 102 stores this single piece of information into the memory 106 as the load information on the entire data library apparatus. Furthermore, the CPU 102 transmits this information to the server 103. Summarizing the load information into the single piece of information in this way makes it unnecessary to make reference to the plural pieces of information when grasping the load information on the entire data library apparatus. This feature allows implementation of easy grasping of this load information. Also, it becomes possible to transmit the data record/reproduction device's load information and the optical-disc transportation device's load information to the server 103 in a collective manner. This feature allows implementation of a reduction in the processing load imposed on the server 103 and the data library apparatus.

Additionally, if the management of the load information is not made in the server 103, the load information to be recorded is information which is created by merging the integrated load information on each data record/reproduction device with the integrated load information on the optical-disc transportation device 107.

Figure 9:
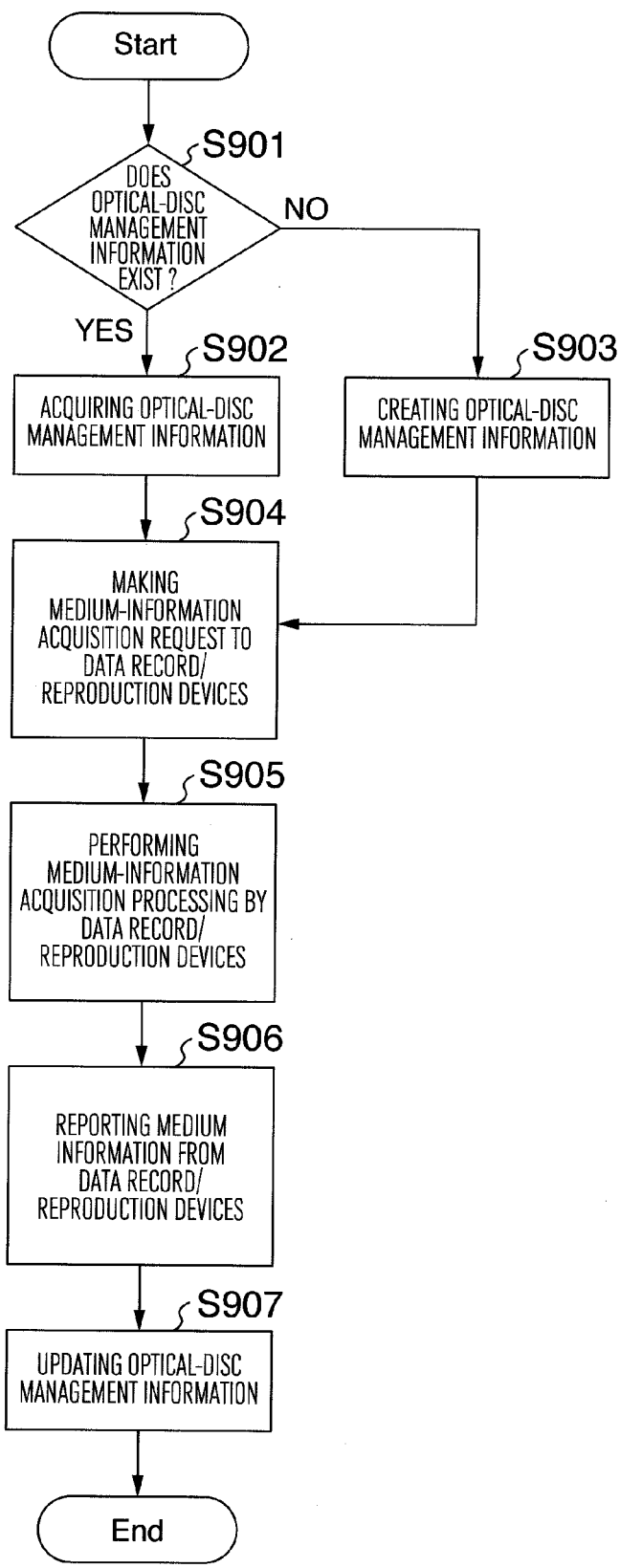
FIG. 9 is a flowchart for illustrating an optical-disc-management-information update processing.

FIG. 9 is a flowchart for illustrating an update processing of optical-disc management information performed by the CPU 102 of the data library apparatus.

If, at a step S901, the optical-disc management information exists within the memory 106, at a step S902, the CPU 102 acquires the optical-disc management information from the memory 106.

Otherwise, if the optical-disc management information does not exist within the memory 106, at a step S903, the CPU 102 creates the optical-disc management information within the memory 106.

Next, at a step S904, the CPU 102 makes a medium-information acquisition request to the data record/reproduction devices. The plurality of data record/reproduction devices and the plurality of optical discs exist inside the data library apparatus. The medium-information acquisition request means that the CPU 102 requests any one of or the plurality of data record/reproduction devices to acquire medium information about any one of or the plurality of optical discs. Also, the medium information requested for any one of or the plurality of devices is parameters that the data library apparatus desires, and that any one of or the plurality of devices can acquire. An example of the parameters is an error number or error ratio at the time of performing data read/write from/into any one of the optical discs.

Next, at a step S905, any one of or the plurality of data record/reproduction devices acquires or acquire the parameters from any one of or the plurality of optical discs. Moreover, at a step S906, any one of or the plurality of devices issues or issue a report on the result to the CPU 102 of the data library apparatus.

Next, at a step S907, the CPU 102 of the data library apparatus causes the report result at the step S906 to be reflected onto the optical-disc management information that the CPU 102 has acquired at the step S902. Furthermore, the CPU 102 writes this updated optical-disc management information into the memory 106. This updated optical-disc management information may also be recorded into the memory 106 in a collective manner with the data record/reproduction device's load information and the optical-disc transportation device's load information. In addition, these pieces of information may also be transmitted to the server 103 in a collective manner.

FIG. 10 illustrates the optical-disc management information which is to be recorded into the memory 106 of the data library apparatus. The optical-disc management information is information about each optical disc which is stored into the data library apparatus. The information which will be recorded as its example are as follows: General information such as disc serial number and disc type, information such as date on which disc management was started and date on which the disc access was made last, and information indicating number-of-times in which the disc accesses were made, and the disc's deterioration degree.

The disc's deterioration degree is information which, at the step S907, the CPU 102 of the data library apparatus calculates based on the parameters reported from any one of or the plurality of data record/reproduction devices. For example, the disc's deterioration degree is evaluated and recorded using five stages depending on the error ratio of any one of the optical discs.

The update processing of the optical-disc management information like this may be executed as one step of the record/reproduction processing, or may be executed individually in a manner of separating this update processing from the record/reproduction processing.

Additionally here, it is assumed that the management in general of the optical-disc management information is made by the CPU 102 of the data library apparatus. Basically the same effects, however, can be obtained using other methods, of course. For example, the following management is also allowable: Namely, the creation of the management information including the judgment on each optical disc's deterioration degree is performed by the CPU 207 of each data record/reproduction device. Meanwhile, the CPU 102 of the data library apparatus receives the management information that each data record/reproduction device has created, then writing the received management information into the memory.

Next, the explanation will be given below concerning the control over data library apparatuses using the collected load information. The load information describes therein the load information on each data record/reproduction device, each optical disc, and the optical-disc transportation device which are built in each data library apparatus. Making reference to the load information on each data record/reproduction device, the load information on each optical disc, and the load information on the optical-disc transportation device allows implementation of the exertion of more effective control over each data library apparatus. For example, when performing the record/reproduction of data, the server can exert the control over each data library apparatus in such a manner that the loads imposed on the plurality of data record/reproduction devices built in each data library apparatus are not biased. This control is made possible by using a data record/reproduction device whose load is the smallest. At this time, when determining this instruction-issuing destination, the server makes reference to the load information in addition to information as to which data record/reproduction devices of which data library apparatuses are usable. Moreover, when determining which data record/reproduction device and which data library apparatus should be used from among the usable data record/reproduction devices and data library apparatuses, the server makes reference to the load information. Then, from the load information, as described above, the server identifies the data record/reproduction device whose load is the smallest. Furthermore, the server issues the instruction to the data library apparatus in which this smallest-load data record/reproduction device is built. The loads, which are imposed on all of the data record/reproduction devices managed by the server, will not be biased by exerting the control over the data library apparatuses as explained above.

Of course, in addition to this control, a variety of modified controls are also conceivable. For example, the following controls are also allowable: Namely, the control is exerted such that, even if the loads are biased, a data record/reproduction device whose performance is satisfying as much as possible is used. Furthermore, the control is exerted such that, taking into consideration the load imposed on the optical-disc transportation device, an optical disc and a data record/reproduction device which are effective enough even if the transportation distance is relatively short are used so that the load is not imposed on the device as much as possible. In whatever case, as one condition at the time when selecting and determining the data library apparatus, data record/reproduction device, optical disc, and optical-disc transportation device which are to be used, the point that the load information is used remains the same.

Incidentally here, the explanation has been given selecting, as its example the case where the server is in charge of a role of determining the instruction. For example, however, in a data library apparatus which is used in a manner of being not connected to the server, the CPU 102 of the data library apparatus is allowed to make reference to the load information, and to determine which data record/reproduction device should be used.

Based on the above-described configuration, in the first embodiment of the present invention, the load information on the plurality of data record/reproduction devices and the load information on the optical-disc transportation device built in the data library apparatus are collected, then being recorded into the memory. Moreover, these plural pieces of load information are transmitted to the server in a collective manner. This feature allows implementation of a reduction in the processing load imposed on the server and the data library apparatus.

Also, these plural pieces of load information are recorded on each device basis, or on each device's block basis. This feature allows implementation of detailed grasping of the load inside each device.

Also, the load information records therein each-device-specific information simultaneously. This feature makes it possible to accurately record the load imposed on each device. As a result, for example, even if a built-in device is swapped, a suitable addressing is made executable in such a manner that the load information on a new device replaced is prompted to be recorded.

Also, in addition to the individual record of the load information on each device basis, the single piece of information created by merging the plural pieces of load information on all of the built-in devices can also be recorded. This feature makes it possible to provide the information in response to the needs.

Also, the recorded load information can be transmitted to the server. This feature allows the system manager to easily recognize the load information on the data library apparatus.

Also, the recorded information can be left within the memory. Accordingly, if the server should lose the information, this recorded information can be used as the backup. In addition thereto, regarding the management of the information, the data library apparatus itself can manage the information without relying on the server. Moreover, the information on each optical disc accumulated inside the data library apparatus can be recorded into the memory.

Also, the information includes therein the information for indicating each optical disc's deterioration degree. This feature makes it possible to easily search for an optical disc whose deterioration has developed from among the optical discs accumulated inside the data library apparatus. Furthermore, this feature makes it possible to estimate the life expectancy of each optical disc, i.e., the remaining time during which each optical disc will be able to be accessed normally.

Incidentally, in the present invention, the load information on the data record/reproduction devices and the optical-disc management information may also be recorded into the memory 106 in a collective manner, and may be transmitted to the server. Otherwise, the load information on the optical-disc transportation device and the optical-disc management information may also be recorded into the memory 106 in a collective manner, and may be transmitted to the server. This scheme remains basically the same in the following embodiments.

Embodiment 2

Figure 11:
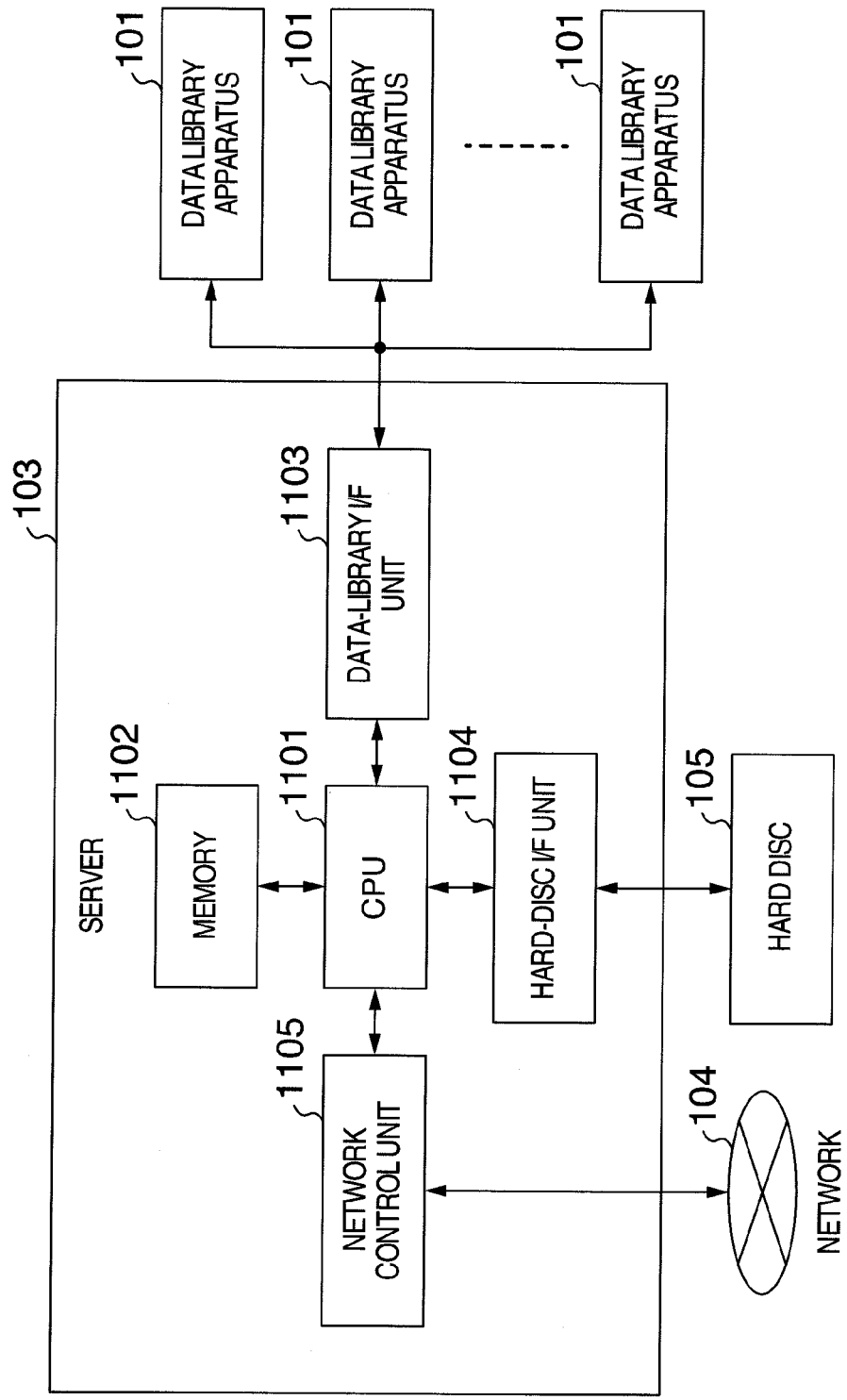
FIG. 11 is a block diagram for illustrating the configuration of a data archive system.

FIG. 11 is a block diagram for illustrating the configuration of a data archive system.

The data archive system is constituted by connecting the one or more data library apparatuses 101, the hard disc 105, and the network 104 to the server 103.

The reference numeral 103 denotes the server. The server 103 provides the data library apparatuses 101 with services whose center is data record/reproduction. Simultaneously, the server 103 performs the data record/reproduction into/from the hard disc 105, and performs data transmission/reception and data management via the network 104.

A reference numeral 1101 denotes a CPU of the server 103. At the time of the data record, the CPU 1101 of the server 103 receives data from the network 104 via a network control unit 1105. Moreover, the CPU 1101 records the data into the hard disc 105 via a hard-disc IF unit 1104.

Otherwise, the CPU 1101 controls the data library apparatuses 101 via a data-library IF unit 1103, thereby recording the data into the optical discs built in the data library apparatuses 101.

At the time of the data reproduction, the CPU 1101 reads the data from the hard disc 105 via the hard-disc IF unit 1104. Moreover, the CPU 1101 transmits the read data to the network 104 via the network control unit 1105.

Otherwise, the CPU 1101 controls the data library apparatuses 101 via the data-library IF unit 1103, thereby reproducing the data from the optical discs built in the data library apparatuses 101. Furthermore, the CPU 1101 receives the reproduced data, then transmitting the received data to the network 104 via the network control unit 1105. Also, the CPU 1101 receives respective types of information from the data library apparatuses 101, then processing, recording, and managing the respective types of information depending on the requirements. Also, the CPU 1101 reproduces the information, then determining a control policy and performing an actual control on the basis of the reproduced information.

A reference numeral 1102 denotes a memory. The memory 1102 records therein a program for controlling the CPU 1101 of the server 103, and the respective types of information. Also, the memory 1102 records therein the data record/reproduction devices' load information, the optical-disc transportation device's load information, and the optical-disc management information which are built in the inside of the data library apparatuses 101, and which are transmitted from the data library apparatuses 101.

The reference numeral 1103 denotes the data-library IF unit. The data-library IF unit 1103 performs the control over the data transmission/reception between the data library apparatuses 101 and the CPU 1101 of the server 103.

Incidentally, in FIG. 11, the plurality of data library apparatuses 101 are connected to the single data-library IF unit 1103. It is also allowable, however, to provide a configuration where the data library apparatuses 101 are connected to the data-library IF unit 1103 via a network.

The reference numeral 1104 denotes the hard-disc IF unit. The hard-disc IF unit 1104 performs the SATA-and-the-like-standard-compliant data transfer with the hard disc 105.

The reference numeral 1105 denotes the network control unit. The network control unit 1105 performs the control over the data transmission/reception between the network 104 and the CPU 1101 of the server 103.

Figure 12:
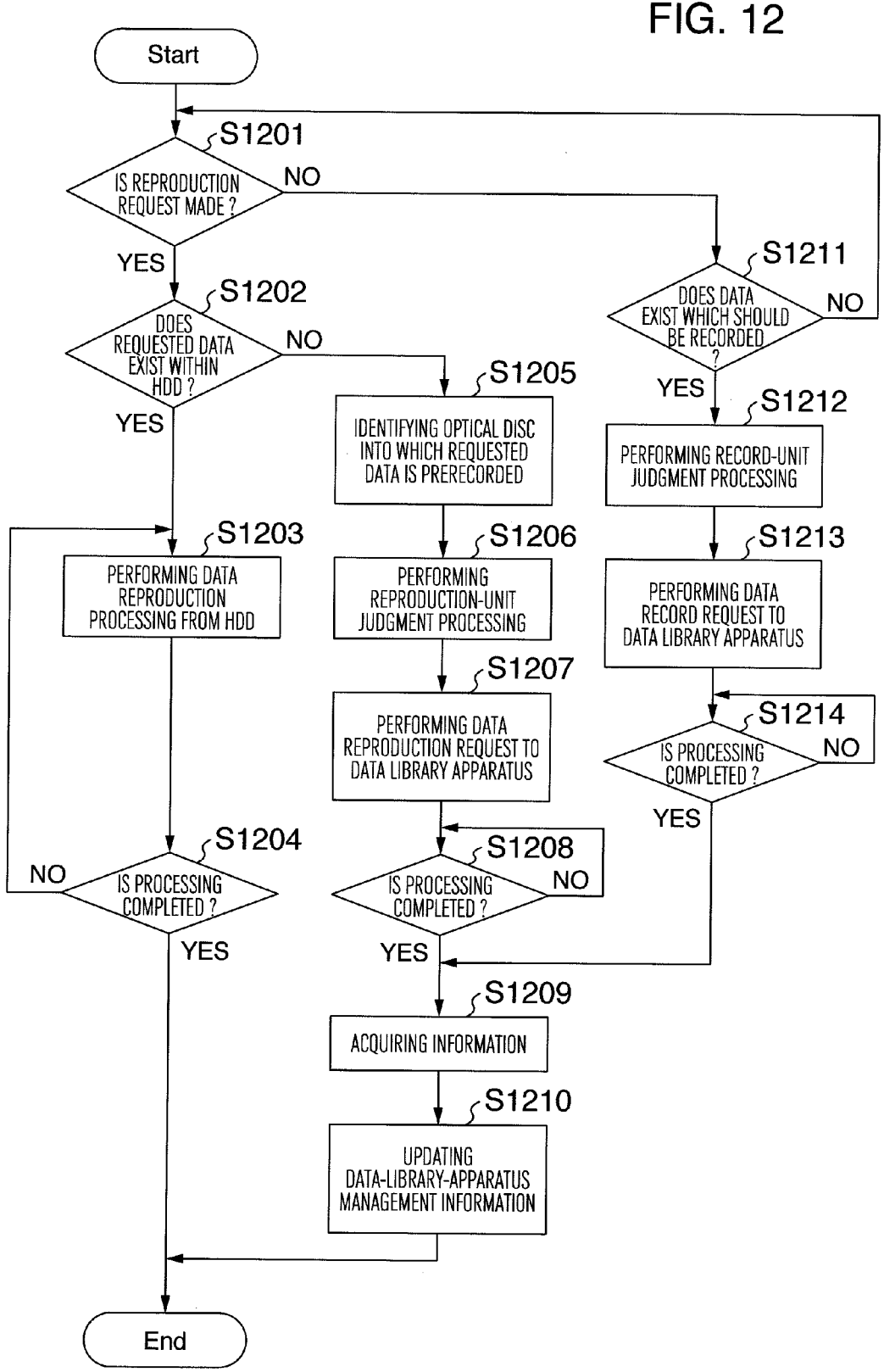
FIG. 12 is a flowchart for illustrating the operation of the data archive system.

FIG. 12 is a flowchart for illustrating the operation of the data archive system.

If, at a step S1201, a data reproduction request is made for the server 103 via the network 104, at a step S1202, the CPU 1101 of the server 103 checks the storage location of the data whose reproduction request is made. Then, if the reproduction-requested data is found to exist within the hard disc 105, at a step S1203, the CPU 1101 of the server 103 performs the data reproduction processing from the hard disc 105. The reproduced data is transmitted from the CPU 1101 of the server 103 to the network 104 via the network control unit 1105. Also, at a step S1204, the CPU 1101 completes the data reproduction processing.

Otherwise, if the reproduction-requested data is not found to exist within the hard disc 105, at a step S1205, the CPU 1101 of the server 103 identifies an optical disc in which the reproduction-requested data is recorded.

Next, at a step S1206, a reproduction-unit judgment processing is performed. The reproduction-unit judgment processing is a processing for judging which data record/reproduction device of which data library apparatus should be used in order to reproduce the optical disc. This judgment processing is performed by a program which is recorded in the memory 1102 of the server 103. This judgment as to which data record/reproduction device of which data library apparatus should be used is performed by a judgment algorithm which is also recorded in the memory 1102. The execution of the reproduction-unit judgment processing determines a data library apparatus and a data record/reproduction device which should be used for the data reproduction processing. Next, at a step S1207, the CPU 1101 of the server 103 issues, to the data library apparatus determined at the step S1206, a notice of notifying the data record/reproduction device which should be used and the optical disc which should be reproduced. In this way, the CPU 1101 makes the data reproduction request. Moreover, the reproduced data is transmitted from the data library apparatus to the CPU 1101 of the server 103 via the data-library I/F unit 1103, then being transmitted to the network 104 via the network control unit 1105.

Next, if at a step S1208, the data reproduction processing is completed, at a step S1209, the acquisition of information is performed. Here, the information to be acquired means information collected by the data library apparatus. Concretely, this information refers to the load information on the data record/reproduction device, the load information on the optical-disc transportation device, and the optical-disc management information. Additionally, the load information may be acquired every time the data record/reproduction device performs the record/reproduction processing, or may be acquired one time every several times in which the device performs the record/reproduction processing.

Next, at a step S1210, the information acquired is processed depending on the requirements. After that, the information processed is recorded into the memory 1102 of the server 103 as data-library-apparatus management information. At this time, if already-existing data-library-apparatus management information has already existed on the memory 1102, the information acquired at the step S1209 and the already-existing information are added to each other, then being recorded into the memory 1102.

FIG. 13 is a table for illustrating an example of the data-library-apparatus management information recorded and managed by the data archive system.

The example illustrated in FIG. 13 records therein the following information for each data library apparatus 101 used by the data archive system: The serial number of each data library apparatus 101, the serial numbers of the plural units of data record/reproduction devices built in each data library apparatus 101, and the load information on the plural units of data record/reproduction devices, the load information on the optical-disc transportation device built in each data library apparatus 101, and the optical-disc management information built in each data library apparatus 101.

Figure 14:
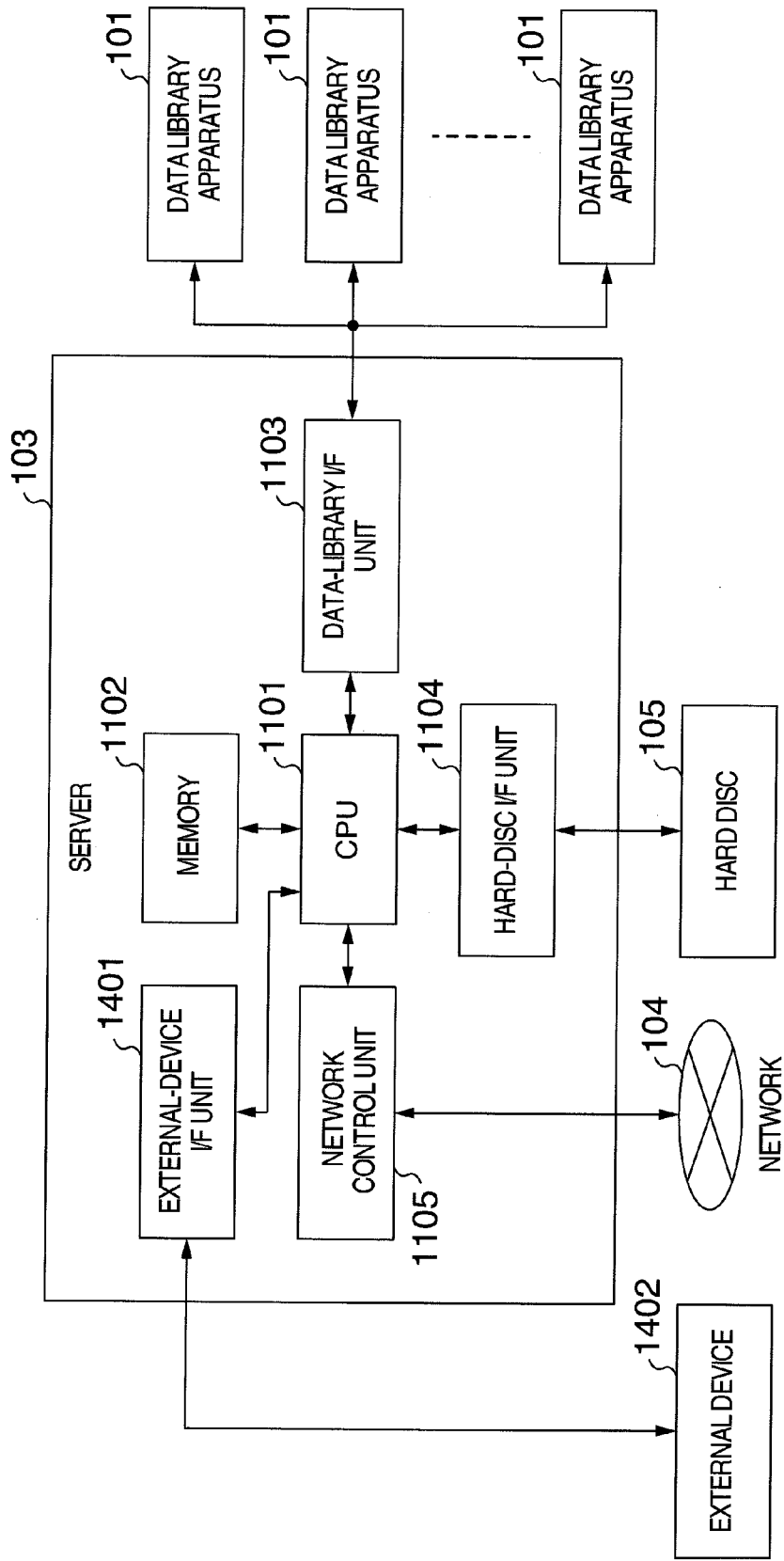
FIG. 14 is a block diagram for illustrating the configuration of the data archive system which is connectable to an external device.

For example, in a case where the data archive system is the one illustrated in FIG. 14, and where the four units of data record/reproduction devices are built in each data library apparatus 101 as are illustrated in FIG. 1, the table illustrated in FIG. 13 records therein the following information for each data library apparatus 101: The load information on the four units of data record/reproduction devices, the load information on the one unit of optical-disc transportation device, and the optical-disc management information. If the number of the devices built in each data library apparatus 101, e.g., the number of the data record/reproduction devices and optical-disc transportation device, is increased/decreased, the information to be recorded is increased/decreased in correspondence with the increase/decrease in the number of the devices, of course.

Also, the example illustrated in FIG. 13 indicates, using IDs, the load information on the four units of data record/reproduction devices, the load information on the one unit of optical-disc transportation device, and the optical-disc management information. Moreover, reference is made to information which is recorded separately and independently. It is of course allowable, however, that each information itself is recorded into the data-library-apparatus management information.

Incidentally, the data record/reproduction device's load information (e.g., INF-RP101) is the information which is illustrated in, e.g., FIG. 4.

The optical-disc transportation device's load information (e.g., INF-DR001) is the information which is illustrated in, e.g., FIG. 8.

The optical-disc management information (e.g., INF-DI001) is the information which is illustrated in, e.g., FIG. 10.

Additionally, the data-library-apparatus management information does not exist from the beginning, but is newly created at such occasions as an initial setting time of the data archive system. Of course, it is also possible to create the data-library-apparatus management information at occasions other than the initial setting time. For example, it is also possible to create the management information before the step S1201 or at the step S1210 illustrated in FIG. 12.

Also, the CPU 1101 of the server 103 performs not only the control over the data reproduction processing, but also the control over the data record processing. The start trigger for the data record processing is a data record request made via the network 104. In this case, it is effective enough to perform the record processing by controlling the data library apparatuses 101 appropriately in accordance with the record request. Accordingly, its detailed explanation will be omitted here.

Here, the detailed explanation will be given below regarding a case where the start trigger for the data record processing is a judgment which is made by the CPU 1101 of the server 103 at a step S1211.

At the step S1211, the CPU 1101 of the server 103 checks whether or not, of the data recorded in the hard disc 105, there exists data which should be recorded into an optical disc. The data which should be recorded into the optical disc refers to, in other words, data which should displace from the hard disc 105 into the optical disc, or data which results in no problem even if the data has displaced.

The judgment processing as to which data should be recorded into the optical disc is performed by a program which is recorded in the memory 1102 of the server 103. The judgment as to which data should be recorded into the optical disc is performed by a judgment algorithm which is also recorded in the memory 1102. An example which should be used as the criterion when performing the judgment is as follows: Namely, the data is the one whose record request has been not made for a constant time-interval or more.

If there exists the data which should be recorded into the optical disc, at a step S1212, a record-unit judgment processing is performed. The record-unit judgment processing is a processing for judging which data record/reproduction device and which optical disc of which data library apparatus should be used in order to record the data into the optical disc. This judgment processing is performed by a program which is recorded in the memory 1102 of the server 103. This judgment as to which data record/reproduction device and which optical disc of which data library apparatus should be used is performed by a judgment algorithm which is also recorded in the memory 1102.

The execution of the record-unit judgment processing determines a data library apparatus, a data record/reproduction device, and an optical disc which should be used for the data record processing. Next, at a step S1213, the CPU 1101 of the server 103 issues, to the data library apparatus determined at the step S1212, a notice of notifying the data record/reproduction device and the optical disc which should be used. Also, the CPU 1101 passes, to the data library apparatus, the data which should be recorded. In this way, the CPU 1101 makes the data record request.

Next, if, at a step S1214, the data record processing is completed, the step S1209 and the step S1210 are performed.

The details at the step S1209 and the step S1210 are not different from the ones at these steps in the data reproduction processing. Accordingly, its detailed explanation will be omitted here.

In the data archive system in the present embodiment, the above-described configuration makes it possible to receive the data reproduction request made via the network, and to reproduce the data from the hard disc.

Also, if the reproduction-requested data is found to be recorded in an optical disc, the above-described configuration makes it possible to reproduce the data by identifying the optical disc which records the data therein, the data library apparatus which stores the optical disc therein, and the data record/reproduction device which is optimum for reproducing the optical disc. Simultaneously, the above-described configuration makes it possible to record, update, and manage the information about the load imposed on each device at the time of the data reproduction, and the optical-disc management information about the optical disc reproduced.

Also, if it is judged that data which should be recorded exists within the hard disc, the above-described configuration makes it possible to record the data into an optical disc which is optimum for recording the data by identifying the optical disc, the data library apparatus, and the data record/reproduction device which are optimum for recording the data. Simultaneously, the above-described configuration makes it possible to record, update, and manage the information about the load imposed on each device at the time of the data record, and the optical-disc management information about the optical disc into which the data is recorded.

Also, the plural pieces of load information on the data library apparatuses are recorded into the memory in a collective manner. This feature allows the plural pieces of load information to be managed in a manner of being made related to each other.

The above-described configuration is the basic configuration of the data archive system in the present embodiment. In addition thereto, a variety of modified configurations of the system are conceivable. In particular, by using the variety of modified configurations separately depending on the user's taste and use environment, it becomes possible to anticipate a further enhancement in the ease-of-use of the data archive system.

Hereinafter, some of the modified configurations will be explained:

First, it has been assumed that the plural pieces of load information on the data library apparatuses are recorded into the memory 1102 of the server 103. The load information, however, may also be recorded into the hard disc 105.

Also, the following configurations are also allowable: Namely, the same information are always recorded into the memory 1102 of the server 103 and the hard disc 105. Moreover, the easily-accessible information on the memory is mainly utilized; while the information on the hard disc is utilized as backup.

Also, the following configurations are also allowable: Namely, the record destination is divided depending on the information's type, reference frequency, and detailedness. For example, only the partial information which are specifically important for recognizing the devices' load degrees are recorded into the memory 1102. The other information are recorded into the hard disc 105, and reference is made thereto only on a necessary scene. The employment of the configuration like this allows implementation of tactical and productive utilization of the characteristics of the fast-access but small-capacity memory and the characteristics of the hard disc whose access is slower but whose capacity is larger as compared with the memory.

Moreover, the judgment algorithms in the reproduction-unit judgment processing at the step S1206 and the record-unit judgment processing at the step S1212 make reference to the data-library-apparatus management information. Then, the judgment algorithms use this management information as one judgment criterion, thereby determining a data library apparatus, a data record/reproduction device, and an optical disc which should be used for the data record/reproduction processing.

Also, the following configuration is also allowable: Namely, as illustrated in, e.g., FIG. 14, an external device is connected to the data archive system by providing an interface for connecting the external device to the data archive system. In the data archive system in the present embodiment, the data-library-apparatus management information can be recorded. Also, the management information recorded is information which is useful for managing the system appropriately. Consequently, it is preferable that the system manager can make reference to the management information as easily as possible.

Accordingly, the configuration is so designed as to be able to connect the external device 1402 to the external-device I/F unit 1401. This configuration permits the system manager to view and manipulate the management information on the external device. The external device 1402 refers to a display device such as, e.g., a monitor or television, or an input device such as, e.g., a keyboard or mouse. Of course, setting up a plurality of interfaces allows simultaneous co-use of the display device and the input device.

The CPU 1101 of the server makes it possible to reproduce the recorded data-library-apparatus management information, thereby allowing the management information to be displayed on the display device of the external device 1402 via the external-device I/F unit 1401. At this time, the configuration is so designed as to provide a graphical user interface using a program recorded in the memory. This configuration permits the system manager to grasp the contents of the data-library-apparatus management information more intuitively.

Furthermore, the display device and the input device permit the system manager to edit the data-library-apparatus management information. Here, setting up the interface for permitting the system manager to edit the data-library-apparatus management information allows implementation of a tremendous enhancement in the ease-of-use of the data archive system. For example, there exists a case where, based on the contents of the data-library-apparatus management information, the system manager checks one of the data record/reproduction devices, and swaps the data record/reproduction device with another data record/reproduction device.

In this case, it runs out that the system manager removes a high-load data record/reproduction device temporarily from the data library apparatus. At this time, the system manager is permitted to remove the high-load device via the interface provided by the CPU 1101 of the server.

Figure 15:
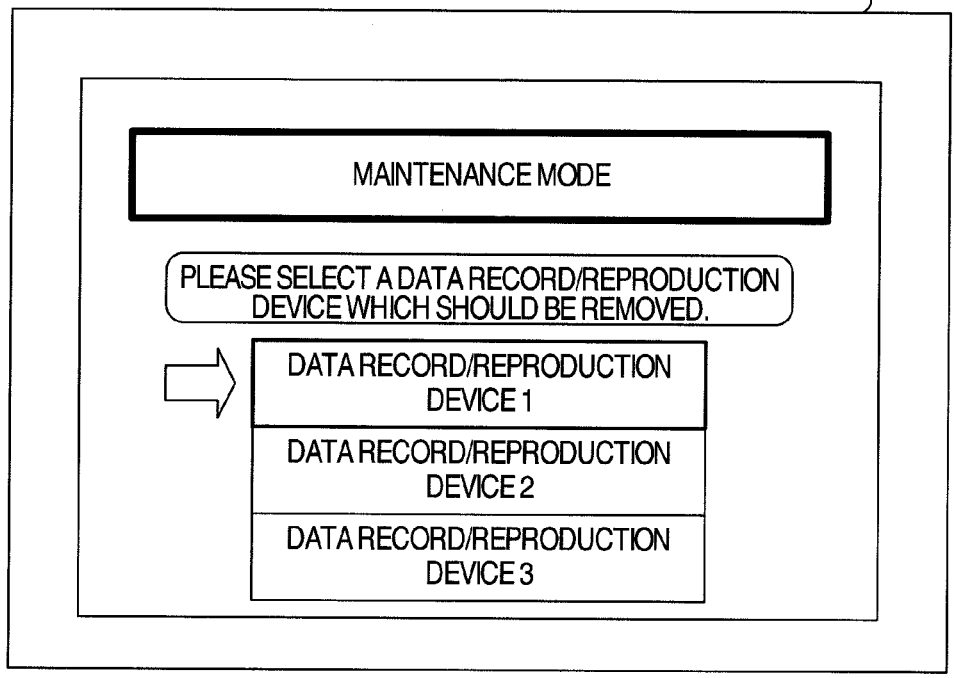
FIG. 15 is a diagram for illustrating a user interface provided by the data archive system.
Figure 16:
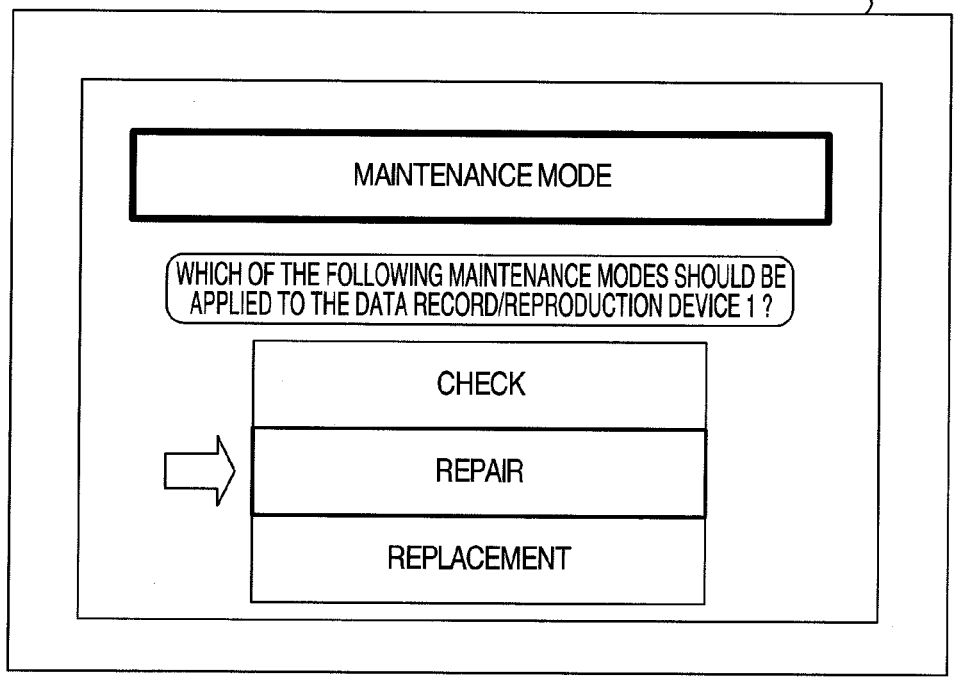
FIG. 16 is a diagram for illustrating the user interface provided by the data archive system.

FIG. 15 and FIG. 16 are examples of the user interface screens provided by the data archive system.

It is assumed that the screens illustrated in FIG. 15 and FIG. 16 are displayed on the display device, which is the external device 1402, and can be operated from the input device, which is also the external device 1402 similarly.

In FIG. 15, the CPU 1101 of the server prompts the system manager to select which of the data record/reproduction devices should be removed from the data archive system. Then, if the user selects that, for example, the data record/reproduction device 1 should be removed therefrom, in FIG. 16, the CPU 1101 prompts the user to select which of maintenance modes should be applied to the data record/reproduction device 1. This means that the CPU 1101 prompts the user to select a maintenance mode from among the following maintenance modes: Namely, each block of the data record/reproduction device 1 should be merely checked, the data record/reproduction device 1 should be made as good as a new device by repairing each block thereof, and the data record/reproduction device 1 should be replaced by another data record/reproduction device.

Here, the CPU 1101 of the server changes the information processing mode for the information about the data record/reproduction device 1 out of the data-library-apparatus management information, depending on the selection result specified from the user.

FIG. 17 is a flowchart for illustrating an operation for determining the information processing mode for the data-library-apparatus management information in the data archive system.

If, at a step S1701, an input is performed to the effect that the check of the data record/reproduction device 1 should be performed, at a step S1702, such information as check time-and-date, check history, and check contents is appended to a portion which, of the data-library-apparatus management information, corresponds to the data record/reproduction device 1.

Incidentally, the following processing mode is also allowable: Namely, when the data record/reproduction device 1 is removed for the check, such information is not appended. Instead, when the check is over to return the data record/reproduction device 1, such information is appended.

If, at a step S1703, an input is performed to the effect that the repair of the data record/reproduction device 1 should be performed, at a step S1704, such information as repair history and modified information is appended to the portion which, of the data-library-apparatus management information, corresponds to the data record/reproduction device 1.

Incidentally, the following processing mode is also allowable: Namely, when the data record/reproduction device 1 is removed for the repair, such information is not appended. Instead, when the repair is over to return the data record/reproduction device 1, such information is appended. For example, if, at the time of the repair, the PU unit of the data record/reproduction device 1 is replaced by a new one, it is conceivable that the load accumulated in the PU unit is lost. Accordingly, the load information on the PU unit of the data record/reproduction device 1 is reset of the data-library-apparatus management information. Also, it is preferable to record information for indicating the fact to the effect that the PU unit is replaced, and the time-and-date on which the PU unit is replaced.

Additionally, consideration is given to a case where the repair is performed on each location basis. Namely, although not illustrated in FIG. 17, the user is prompted to input which location of the data record/reproduction device 1 should be repaired. This processing mode makes it possible to execute the more detailed control.

If, at a step S1705, an input is performed to the effect that the replacement of the data record/reproduction device 1 should be performed, at a step S1706, the information which corresponds to the data record/reproduction device 1 is deleted of the data-library-apparatus management information recorded up to the present. This is because the replacement of the data record/reproduction device 1 makes unnecessary the management information on the data record/reproduction device 1 recorded up to the present.

By the way, there also exists the following possibility: Namely, the data record/reproduction device 1 is replaced by another data record/reproduction device once, but after that, the data record/reproduction device 1 is connected to the system again. In order to address the situation like this, the following processing modes are also allowable, for example: Namely, instead of being deleted, the management information corresponding to the data record/reproduction device 1 is left in the memory for a constant time-interval. Otherwise, the management information is deleted from the data-library-apparatus management information, but is copied into another management information. Otherwise, the management information is deleted from the memory 1102, but the backup is left in the hard disc 105. Also, the user is permitted to be able to make a selection from these processing modes.

The above-described configuration makes it possible to provide the interface for editing the data-library-apparatus management information recorded in the data archive system.

Additionally, here, it has been assumed that the external device is connected to the server 103, and that the data-library-apparatus management information is edited thereby. The data-library-apparatus management information, however, may also be edited by the data library apparatuses 101. Also, the data-library-apparatus management information may also be transmitted to the network 104 in response to the request made from the network 104.

Also, there exists a modified example which will be explained hereinafter:

For example, the following situation is assumed: Namely, the CPU of the server or of the data library apparatus detects from the load information that the load imposed on a certain data record/reproduction device (which will be referred to as "drive A") has become exceedingly high. From this information, it can be judged that the reliability of data is low which the drive A has written into a disc within a few days (or, a few hours) from now. Accordingly, this data and this disc associated with the write processing by the drive A are identified from the disc information. Subsequently, the same data is rewritten into the same disc by using another drive. Otherwise, the user is informed of a notice to the effect that the reliability of the data written in the disc is low. These countermeasures allow implementation of an enhancement in the reliability of data storage as the data archive system.

Another modified example is as follows: A read error of a disc occurs, thereby failing in the read of data recorded in the disc. In this case, there is a possibility that the write processing has been incomplete. Accordingly, the drive which has written the data is identified from the load information. Subsequently, the drive identified is selected as a maintenance target. Otherwise, the load information on the drive is confirmed once, instead of selecting the drive as the maintenance target immediately. Then, if a constant or larger load is found, the drive is selected as the maintenance target. These countermeasures allow implementation of an enhancement in the reliability of data storage as the data archive system.

Still another modified example is as follows: The CPU of the server or of the data library apparatus detects from the load information that the load imposed on the optical-disc transportation device has become exceedingly high. From this information, it can be judged that a disc which the optical-disc transportation device has transported from or into the optical-disc storage device within a few days (or, a few hours) from now is in a danger of being a different disc or of having been stored into a different storage position. Accordingly, this disc associated with the transportation processing by the optical-disc transportation device is identified from the disc information. Subsequently, a comparison is made between the disc information and the real object of the disc, thereby confirming whether or not the transportation errors exist. Otherwise, the user is informed of a notice to the effect that the maintenance of the optical-disc transportation device is necessary. These countermeasures allow implementation of an enhancement in the reliability of data storage as the data archive system.

Incidentally, the present invention is not limited to the above-described embodiments, but includes a variety of modified embodiments. For example, the above-described embodiments have been explained in detail in order to explain the present invention in an easy-to-understand manner. Namely, the present invention is not necessarily limited to the embodiments which include all of the configurations explained here. Also, a partial configuration of the entire configuration of a certain embodiment can be replaced by the configuration of another embodiment. Also, the configuration of another embodiment can be added to the configuration of a certain embodiment. Also, the addition/deletion/replacement of another configuration can be performed with respect to a partial configuration of the entire configuration of each embodiment.

Also, the above-described factors such as each configuration, function, processing unit, and processing scheme may be implemented using hardware by designing a partial or entire element of the factors using devices such as, e.g., integrated circuits. Also, the above-described factors may be implemented using software by processor's interpreting and executing a program for implementing each factor. The information such as each-factor implementing program, table, and file can be stored on record devices such as memory, hard disc, and SSD (: Solid State Drive), or record media such as IC card, SD card, and DVD.

Also, only the control lines and information lines have been indicated which are conceivable as being needed for the explanation. Namely, all of the control lines and information lines resulting from the product's point-of-view are not necessarily indicated. It is also allowable to consider that, actually, almost all of the configurations are connected to each other.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A data library apparatus for managing plural pieces of record media, and performing record/reproduction of data into/from the record media, the data library apparatus being connected to a server,
the data library apparatus, comprising:
one or more data record/reproduction devices which perform the record/reproduction of the data into/from the record media;
a record-media storage device which stores the plural pieces of record media therein;
a record-media transportation device which transports the record media between the record-media storage device and each of the data record/reproduction devices to perform reception/pass of the record media therebetween;
a memory unit which memorizes information; and
a control unit which exerts a control of
acquiring at least two pieces of load information from among data record/reproduction devices' load information, record-media transportation device's load information, and record media's load information,
summarizing the acquired load information into aggregated information, and
transmitting the aggregated information to the server.

2. The data library apparatus according to claim 1, wherein collection of the data record/reproduction devices' load information is performed when the record/reproduction operation by the data record/reproduction devices is performed,
collection of the record-media transportation device's load information being performed when the transportation operation by the record-media transportation device is performed,
collection of the record media's load information being performed when accesses to the record media occur.

3. The data library apparatus according to claim 1, wherein, when the control unit memorizes the load information into the memory unit, if already-existing load information has already existed within the memory unit,
the control unit merges the acquired load information and the already-existing load information into cumulative load information, of a load wear on the data record/reproduction devices, cumulative load information of a load wear on the record-media transportation device, and cumulative load information imposed on the record media,
the control unit then memorizing at least two pieces of the cumulative load information.

4. The data library apparatus according to claim 1, wherein the control unit collects the data record/reproduction devices' load information, the record-media transportation device's load information, and the record media's load information as individual information on each device basis,
the control unit then memorizing the collected load information into the memory unit as information for indicating the load which is imposed for each device that the data library apparatus comprises.

5. The data library apparatus according to claim 1, further comprising:
an output unit which outputs information for indicating whether or not maintenance of the data library apparatus should be performed based on the load information.

6. The data library apparatus according to claim 1, wherein the load wear on the data record/reproduction devices is estimated based on the data record/reproduction devices' load information.

7. The data library apparatus according to claim 1, wherein the load wear on the record media is estimated based on the record media's load information.

8. A server, comprising:
a network connection unit which establishes a connection to a network;
a record-media connection unit which establishes a connection to record media;
a data-library-apparatus connection unit which establishes a connection to one or more data library apparatuses;
a memory unit which memorizes information; and
a control unit configured to exert a control of
acquiring aggregated load information via the data-library-apparatus connection unit, and
memorizing the acquired aggregated load information into the memory unit,
wherein the aggregated load information is information aggregating at least two load information, the load information are data record/reproduction devices' load information of a load wear on data record/reproduction devices that each of the data library apparatuses comprises, record-media transportation device's load information of a load wear on a record-media transportation device that each of the data library apparatuses comprises, and record media's load information of a load wear on the record media that are set up on the data record/reproduction devices.

9. The server according to claim 8, wherein,
when the control unit memorizes the load information into the memory unit, the load information of a load wear on the data library apparatuses, if already-existing load information of a load wear on the data library apparatuses has already existed within the memory unit,
the control unit merges the acquired aggregated load information of a load wear on the data library apparatuses and the already-existing load information into cumulative load information,
the control unit then memorizing the cumulative load information into the memory unit, the cumulative load information of a load wear on the data library apparatuses.

10. The server according to claim 8, wherein,
when the control unit acquires plural pieces of load information from the plurality of data library apparatuses,
the control unit memorizes the respective plural pieces of load information in such a manner that the respective load information are divided on each data-library-apparatus basis.

11. The server according to claim 8, wherein,
when the control unit acquires plural pieces of the load information from the plurality of data library apparatuses,
the control unit summarizes each data library apparatus and the load information on each data library apparatus into aggregated load information by causing each data library apparatus and the load information to be related to each other,
the control unit then memorizing the aggregated load information into the memory unit.

12. The server according to claim 8, wherein,
before the control unit issues a record/reproduction request to the data library apparatuses,
the control unit reads the load information memorized into the memory unit,
the control unit then, based on the load information read, determining a data library apparatus, a data record/reproduction device, and a record medium that should be used for the record/reproduction processing, the data library apparatus comprising the data record/reproduction device and the record medium.

13. The server according to claim 8, wherein
the control unit is equipped with an interface for allowing a user to operate the server based on the load information memorized into the memory unit.

14. The server according to claim 8, wherein
the control unit determines an information processing mode for the load information in accordance with a selection made from a user, the load information being memorized into the memory unit.

15. A data library system for recording/reproducing data into a recording media, comprising:
a data library apparatus; and
a server,
wherein the data library apparatus comprises:
one or more data record/reproduction devices which perform the record/reproduction of the data into/from the record media;
a record-media storage device which stores the plural pieces of record media therein;
a record-media transportation device which transports the record media between the record-media storage device and each of the data record/reproduction devices to perform reception/pass of the record media therebetween;
a memory unit which memorizes information; and
a control unit which exerts a control of
acquiring at least two pieces of load information from among data
record/reproduction devices' load information, record-media transportation device's load information, and record media's load information,
summarizing acquired load information into aggregated information,
and
transmitting the load information to the server.

16. The data library apparatus according to claim 1, wherein
the control unit which exerts a control of memorizing the aggregated information into the memory unit and transmitting the memorized information to the server.

17. The server according to claim 8, wherein
the aggregated load information is information aggregating at least two load information from at least two different devices.

* * * * *